US010362139B2

(12) United States Patent
Raghunathan et al.

(10) Patent No.: US 10,362,139 B2
(45) Date of Patent: Jul. 23, 2019

(54) SYSTEMS AND METHODS FOR RESOURCE ALLOCATION FOR MANAGEMENT SYSTEMS

(71) Applicant: Mitsubishi Electric Research Laboratories, Inc., Cambridge, MA (US)

(72) Inventors: Arvind Raghunathan, Brookline, MA (US); David Bergman, Waltham, MA (US); Nikolaos V. Sahinidis, Pittsburgh, PA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 202 days.

(21) Appl. No.: 15/286,712

(22) Filed: Oct. 6, 2016

(65) Prior Publication Data
US 2018/0103116 A1    Apr. 12, 2018

(51) Int. Cl.
*G06F 15/173* (2006.01)
*H04L 29/08* (2006.01)
*H04L 29/06* (2006.01)

(52) U.S. Cl.
CPC ........... *H04L 67/32* (2013.01); *H04L 67/10* (2013.01); *H04L 67/22* (2013.01); *H04L 67/42* (2013.01)

(58) Field of Classification Search
CPC ......... H04L 67/32; H04L 67/10; H04L 67/22; H04L 67/42; H04L 47/76
USPC ....................................................... 709/224
See application file for complete search history.

(56) References Cited

U.S. PATENT DOCUMENTS

| 5,111,391 A | 5/1992 | Fields et al. |
| 5,737,728 A | 4/1998 | Sisley et al. |
| 5,913,201 A | 6/1999 | Kocur |
| 6,330,935 B1 | 12/2001 | Systermans |

(Continued)

FOREIGN PATENT DOCUMENTS

EP    1087311    1/2004

OTHER PUBLICATIONS

Blakeley et al. "Optimizing Periodic Maintenance Operations for Schindler Elevator Corporation." Interlace, Jan-Feb. 2003. vol. 33, No. 1. pp. 67-79.

*Primary Examiner* — Kristie D Shingles
(74) *Attorney, Agent, or Firm* — Gennadiy Vinokur; James Mcaleenan; Hironori Tsukamoto

(57) ABSTRACT

Methods and systems for servicing of machines by workers within a period of time. Acquiring for each service an available servicing time, a time duration for servicing, a location of the machine, and a number of workers having appropriate qualifications to be concurrently present for a service. Acquiring for each worker a worker availability, qualifications and location. Determining a cost function representing a service schedule for each worker, wherein an optimization of the cost function is subject to constraints. The constraints include a number of workers with qualifications concurrently present for a service, each worker starts and ends the period of time at the same location and travels independently from other workers. The cost function includes maximizing a number of services to be performed; minimizing a number of workers required to perform servicing for each service; or minimizing a total travel time for each worker to the location.

20 Claims, 13 Drawing Sheets

(56) References Cited

U.S. PATENT DOCUMENTS

| | | |
|---|---|---|
| 7,346,531 B2 | 3/2008 | Jacobs |
| 7,937,283 B2 | 5/2011 | Tyni et al. |
| 2002/0059412 A1* | 5/2002 | Azpitarte ............. G05B 19/042 709/223 |
| 2005/0015504 A1 | 1/2005 | Dorne et al. |
| 2006/0015504 A1 | 1/2006 | Yu et al. |
| 2009/0322510 A1* | 12/2009 | Berger ................... G06Q 10/08 340/539.1 |
| 2016/0012707 A1* | 1/2016 | McKinley .............. G08B 25/10 340/679 |

* cited by examiner

SYSTEMS AND METHODS FOR RESOURCE ALLOCATION FOR MANAGEMENT SYSTEMS

FIELD

The present disclosure relates generally to resource allocation for management systems, and, more particularly, to systems and methods for optimizing the allocation of resources to a plurality of services or jobs.

BACKGROUND

Resource assignment and scheduling problems exist in many organizations such as, for example, those involved in service or manufacturing activities. The assignment and scheduling problems require the assignment of resources, such as technicians in a workforce, to appropriate tasks, and the scheduling of each technician at particular time when the task may be completed. Techniques for solving the assignment and scheduling problem must consider various factors including the scheduled times and durations of the pending tasks and the available technicians to do the task or job.

For example, an assignment and scheduling problem arises in the context in the maintenance service industry. A maintenance service environment exists in many organizations, characterized by service technicians committed to the repair and maintenance of a variety of machines, building equipment, etc. The maintenance service technicians travel to the locations to perform preventative maintenance and to provide repair services pursuant to required service calls/repairs.

However, many conventional resource allocation techniques fail due to not closely managing time commitments required to complete each task or fail to manage assigning tasks according to location which results in excess travel time for the technicians.

Accordingly, there is a need for systems and methods for optimizing the allocation of resources by minimizing technician travel time and technician costs, among other things, resulting in maximizing the utilization of resources for management systems.

SUMMARY

Embodiments of the present disclosure provide systems and methods for optimizing the allocation of worker/technician resources to a plurality of services or jobs, in a dynamic resource scheduling environment to achieve optimal assignment and scheduling solutions for workforce related management systems.

Some embodiments of the present disclosure are based on the realization that a particular set of constraints can be applied to a cost function representing a service schedule for a workforce to reduce the possible variable values considered when determining the best possible feasible service schedule for the workforce. For example, we identified one such constraint, that each worker is to be treated independently and not as a group of workers. The present disclosure formulates each individual worker's availability when scheduling services/jobs, i.e. $1^{st}$, $2^{nd}$, or $3^{rd}$ shift, vacations, etc. Such a constraint ensures that each individual worker's schedule can be generated by the algorithms to result in feasibly allocating schedules for the entire workforce, along with ensuring completion of jobs within the specified time window. That said, by knowing when each worker is available to work, such information automatically reduces the possible number of available workers available to perform a specific job at the specified window of time and hence, reduces the search space for the algorithm determining the feasible assignment schedules, i.e. optimal assignment and scheduling solutions. This technique can significantly accelerate the solution process without altering the outcome for obtaining a best schedule for the workforce. Other information considered for each worker is each worker's assigned service center location, specifically, a requirement of starting at a service center location and ending the work day at the same service center location, i.e. returning prior to the end of an eight-hour day. The present disclosure also optionally considers each worker's types of transportation modes available at the assigned worker's service center location in the scheduling process.

In another realization, we identified a constraint which includes a requirement for concurrent presence and a minimal qualification of each worker to complete a job, when considering assigning or scheduling the worker to service a machine. The requirement on number of workers can be mandated by code stipulations or the intensity of work that is to be executed. Such identification of machines that require multiple workers allows the algorithm to greatly reduce the search space and obtain a best workforce schedule faster. The reduction in the search space follows from having to coordinate the schedules among multiple workers that share services. This results in reducing processing time and speeds up the solution of the algorithm, so workforce related management systems can be more responsive in less time.

According to some embodiments of the present disclosure, some initial information is needed to achieve optimal assignment and scheduling solutions for a dynamic workforce scheduling environment for articles of manufacture, i.e. machines. For example, worker/technician related information and machinery servicing related information needs to be obtained. Worker related information can include a total number of workers available and qualified to perform each servicing job during the specific time period is needed. Machine related information can include location of the machines, duration of time required to complete each servicing or job on the machine, and obtaining a total number of machines requiring scheduled servicing for the specific time period, i.e. days, weeks, months and the like. Identification of the available start and stop time window(s) within the specified time period for a worker to have access to the machines to do servicing is also needed. Also, information identifying that a set of components or parts are available for the worker to complete the servicing of the machine may also be needed.

Upon acquiring the above information, a cost function representing a service schedule for each worker for the specific period of time can be determined, wherein an optimization of the cost function is subject to the constraints. The constraints can be previously stored in a memory of a computer, and include a specified number of workers with qualifications that are concurrently present for a specific service, each worker starts and ends the specific period of time at the same location and travels independently from other workers and each service needs to be performed within the specific period within the predetermined time window. Wherein upon determining the cost function, the cost function can include one or combination of: maximizing a number of services to be performed by each worker; minimizing a number of workers required to perform servicing for each service; minimizing the cumulative risk of component failure; or minimizing a total travel time for each worker to the location to be serviced.

According to some embodiment of the present disclosure, in order to apply the optimization of the cost function, the cost function can use Mixed Integer Programming (MIP) algorithm, a Constraint-Processing (CP) algorithm, or both.

Some embodiments of the present disclosure incorporate using the MIP algorithm in combination with the CP algorithm to solve the optimization of the cost function. First, the MIP algorithm solves for determining a set of services to be performed within the specific period of time and within the available predetermined time window for servicing each machine. Along with determining a set of available and qualified workers to perform the servicing for each service within the specific period of time, and within the available predetermined time window for servicing each machine. Second, the CP algorithm is used for determining a service sequencing, in which, the set of services are to be performed within the specific period of time, based upon the available predetermined time window for servicing each machine and the set of available and qualified workers. Along with determining for assigning each worker a sequence, in which, the services are to be performed subject to obtaining a feasible solution. If a feasible solution cannot be obtained, then an additional constraint may be added to invalidate the initial request for assignment of services to the worker. Wherein, the MIP algorithm can then be repeated, along with the CP algorithm, until a feasible solution is determined. The determined feasible solution results in determine the maximum number of services to be performed by each worker, the minimum number of workers required to perform servicing for each service, the minimum cumulative risk of component failure, and/or the minimized total travel time for each worker to the location to be serviced.

According to an embodiment of the present disclosure, a method facilitating servicing of a plurality of machines by one or more worker within a specific period of time, each worker includes a combination of qualifications and located at one or more service center. The method including acquiring machine service information via at least one user input interface, for each service, by a computer. The computer is in communication with the at least one user input interface. The computer includes a tangible computer readable recordable medium containing stored program instructions executable by the computer. Acquiring worker information, for each worker, by the computer. Acquiring constraints to be applied to a cost function, by the computer. The constraints include: a specified number of workers with qualifications that are concurrently present for a specific service; each worker starts and ends the specific period of time at the same location and travels independently from other workers and each service needs to be performed within the specific period within the predetermined time window. Determining the cost function representing a service schedule for each worker for the specific period of time. Wherein an optimization of the cost function is subject to the constraints, such that if the constraints cannot verify at least one acceptable solution, then a user via the at least one user interface imposes additional constraints. Otherwise, when the constraints verify that at least one acceptable solution and the cost function includes one or combination of: maximizing a number of services to be performed by each worker; minimizing a number of workers required to perform servicing for each service; minimizing the cumulative risk of component failure; or minimizing a total travel time for each worker to the location to be serviced.

According to another embodiment of the present disclosure, a system facilitates servicing a plurality of machines by a plurality of workers. The system including at least one user input interface to accept machine service information and worker information. A computer having a computer readable recordable memory and in communication with the at least one user input interface, and has stored therein program instructions executable by the computer. Wherein the computer also includes stored constraints to be applied to a cost function. The constraints include: a specified number of workers with qualifications that are concurrently present for a specific service; each worker starts and ends the specific period of time at the same location and travels independently from other workers; and each service needs to be performed within the specific period within the predetermined time window. Wherein the computer is configured to determine the cost function representing a service schedule for each worker for the specific period of time. Wherein an optimization of the cost function is subject to the constraints, such that the cost function includes one or combination of: maximize a number of services to be performed by each worker; minimize a number of workers required to perform servicing for each service; minimizing the cumulative risk of component failure; or minimize a total travel time for each worker to the location to be serviced; and at least one output interface for rendering to the worker a corresponding service schedule.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

Figure 1:
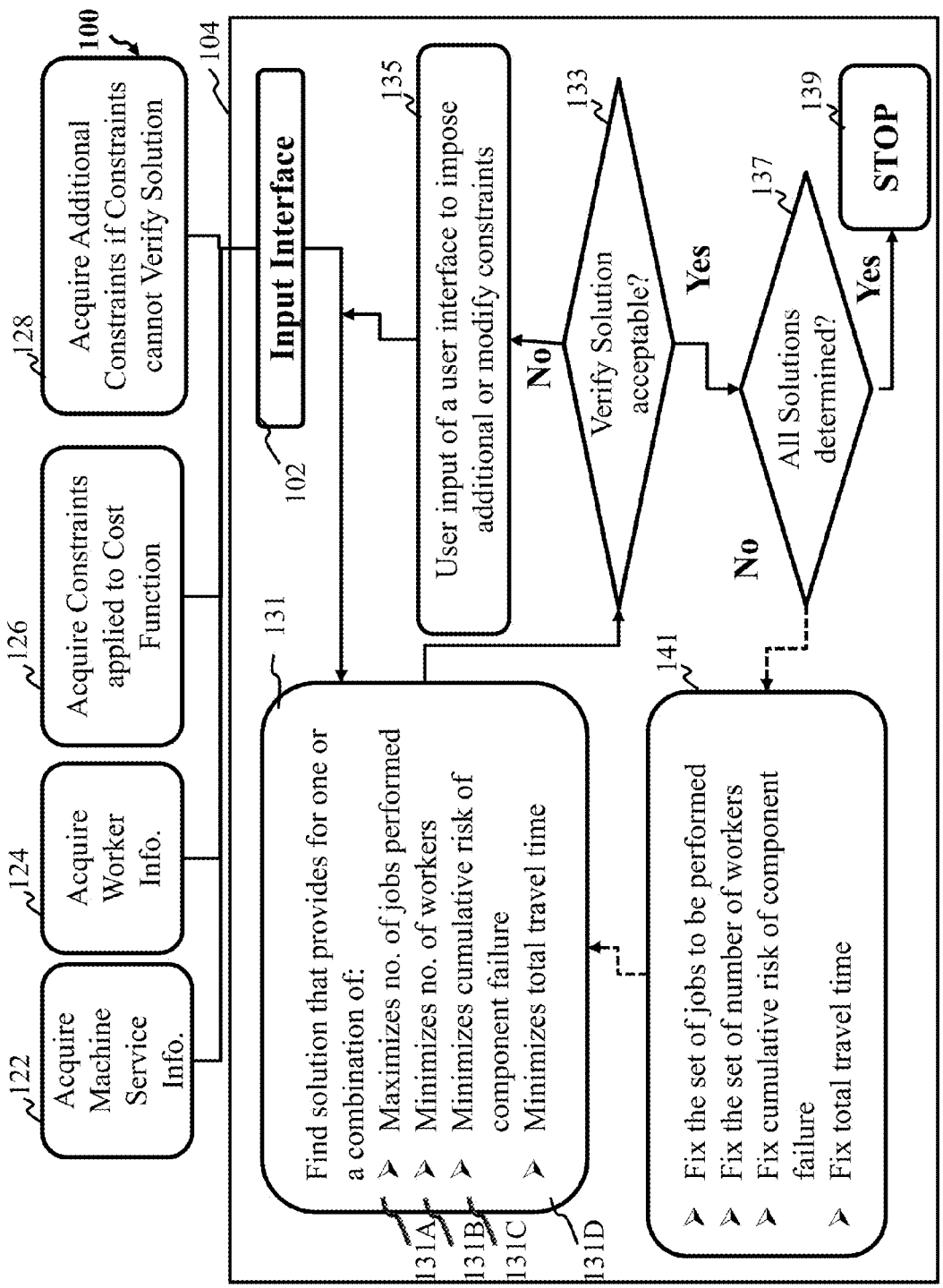
FIG. 1 is a block diagram illustrating a method for facilitating servicing of a plurality of machines by one or more worker within a specific period of time, according to embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

FIG. 1 is a block diagram illustrating a method for facilitating servicing of a plurality of machines by one or more worker within a specific period of time, according to embodiments of the present disclosure. Wherein, each worker includes a combination of qualifications and located at one or more service center.

The method 100 includes acquiring machine service information 122 via at least one input interface 102, for each service, by the computer 104, wherein the computer 104 is in communication with the at least one input interface 102. The machine service information 122 can include an available period of time to perform servicing of a machine. An available predetermined time window to perform servicing the machine. A time duration for servicing of the machine, a location of the machine, and a specified number of workers having appropriate qualifications to be concurrently present for a specific service to be performed.

Still referring to FIG. 1, the computer 104 includes a tangible computer readable recordable medium or memory containing stored program instructions executable by the computer 104. Further acquiring worker information 124 via the at least one input interface 102, for each worker, by the computer 104. The worker information 124 can include an availability of the worker to perform servicing, qualifications of the worker and location of the worker, by the computer.

Acquiring constraints to be applied to a cost function via the at least one input interface 102, by the computer 104. Wherein the constraints 126 can be previously stored in the tangible computer readable recordable medium or memory of the computer 104. The constraints can include a specified number of workers with qualifications that are concurrently present for a specific service. The constraints can also include each worker having their start and end of the specific period of time at the same location and travel independently from other workers. Further, the constraints can also include that each service needs to be performed within the specific period within the predetermined time window.

Still referring to FIG. 1, the method further includes determining the cost function representing a service schedule for each worker for the specific period of time and include the following steps 131, 133, 135, 137, 139:

Step 131 includes finding a solution that provides one or a combination of: maximizes the number of jobs performed 131A; minimizes the number of workers 131B, minimizes the cumulative risk of the component failure 131C or minimizes the total travel 131D, wherein an optimization of the cost function is subject to the constraints.

Step 133, verifies if the solution is acceptable. Such verification typically involves the user checking the schedule provided and verifying that the schedule can be executed by the workforce. This verification step is required in situations when not all constraints are included in the formulation due to their complexity or are revealed to the user after the solution has been obtained. In a certain instance, the imposed constraints can be overly stringent and preclude the computation of a feasible schedule and in such cases the user may modify the constraints so as to enable the method to find a feasible schedule.

Step 135, includes that if the constraints cannot verify at least one acceptable solution, then a user, via the at least one user interface 102 can impose additional constraints 128. For example, additional constraints may be required in situations when not all constraints are included in the formulation due to their complexity or are revealed to the user after the solution has been obtained or that the constraints need to be modified to render the problem feasible. Otherwise, if the constraints are able to verify the at least one acceptable solution, then either more solutions may be determined Step 137 or the process can stop at step 139.

Further, the cost function can include one or combination of: maximizing a number of jobs/services 131A to be performed by each worker; minimizing a number of workers required to perform servicing for each service 131B; minimizing the cumulative risk of failure of the performed jobs 131C performed by workers; or minimizing a total travel time for each worker to the location to be serviced 131D. Depending upon the specific request, the processor 104 is capable of providing one or a combination of the number of jobs/services 131A, and/or the number of workers 131B, the cumulative risk of component failure 131C and/or the total travel time 131D.

Step 137 determines if the initial request for find a certain number of solutions has been satisfied. If not, the verified acceptable solution is fixed 141 and the process restarts to process the remaining requested solutions in step 131.

Upon implementing the constraints and solving for acceptable feasible assignment schedules, i.e. optimal assignment and scheduling solutions, we discovered that when optimizing the cost function subject to these constraints, we are able to formulate the scheduling problem with significantly less amount of data, than conventional scheduling approaches that require much larger amounts of data when solving for the same problem. For example, because of using significantly less amount of data, the process time is reduced, and determining the feasible assignment schedules, i.e. optimal assignment and scheduling solutions, is faster. In view of the less processing time and faster determination of feasible assignment schedules, we also discovered the embodiments of the present disclosure allowed for near real-time scheduling to be performed in a repeated manner, as additional service/job requests become available. We found that due to using less data which reduced the computational effort in solving for feasible workforce assignment schedules improved the function of how the processor or computer itself works. In other words, the embodiments of the present disclosure are able to uniquely formulate the scheduling problem, in a way, that uses significantly less amount of data, less processing time and as a result determine feasible workforce assignment schedules faster, making it possible for near real-time scheduling.

Another discovery from experimentation is the ability of embodiments of the present disclosure to incorporate the uncertainty of job completion times, and provide for scheduling of workers with minimum overlap and maximum worker utilization. Completion times for jobs can be uncertain, or at best difficult to estimate and is the cause of failure for conventional workforce assignment schedules techniques for workforce management systems. However, despite the uncertainties in knowing service completion times, the present disclosure through experimentation discovered that present disclosure methods and systems are still able to provide for robust worker schedules, i.e. scheduling of workers with minimum overlap and maximum worker utilization.

At least one other aspect of the present disclosure is an ability to utilize or reuse previously determined acceptable feasible assignment schedules, i.e. optimal assignment and scheduling solutions. The previously determined acceptable feasible assignment schedules are stored in memory, and accessed either while determining an initial feasible solution, or after an acceptable initial feasible solution is determined, for optimization. We discovered that use of the previously determined acceptable feasible assignment schedules can result in a reduction of computational time.

The present disclosure substantiates these results based on experimentation, and to our surprise, the results revealed feasible workforce assignment schedules that are processed using less data and in a faster processing time. Based upon the experimentation, the determined feasible assignment schedules produced optimized schedules which minimized a worker's total travel time, minimized the cumulative risk of component failure in performing the service, minimized the number of worker's to perform a service/job, and maximized a worker's number of services to be performed, within the specific scheduled time period. Specifically, the systems and methods of the present disclosure are able to formulate a scheduling problem of servicing manufactured articles, i.e. machines, utilizing a cost function subject to the set of constraints, in such a way as to improve the technical field of workforce scheduling of servicing machines for workforce related management systems. At least some benefits of the embodiments of the present disclosure included minimizing worker travel time, minimizing the down-time of the manufactured article and lowering worker overall costs within the scheduled time period.

Figure 2A:
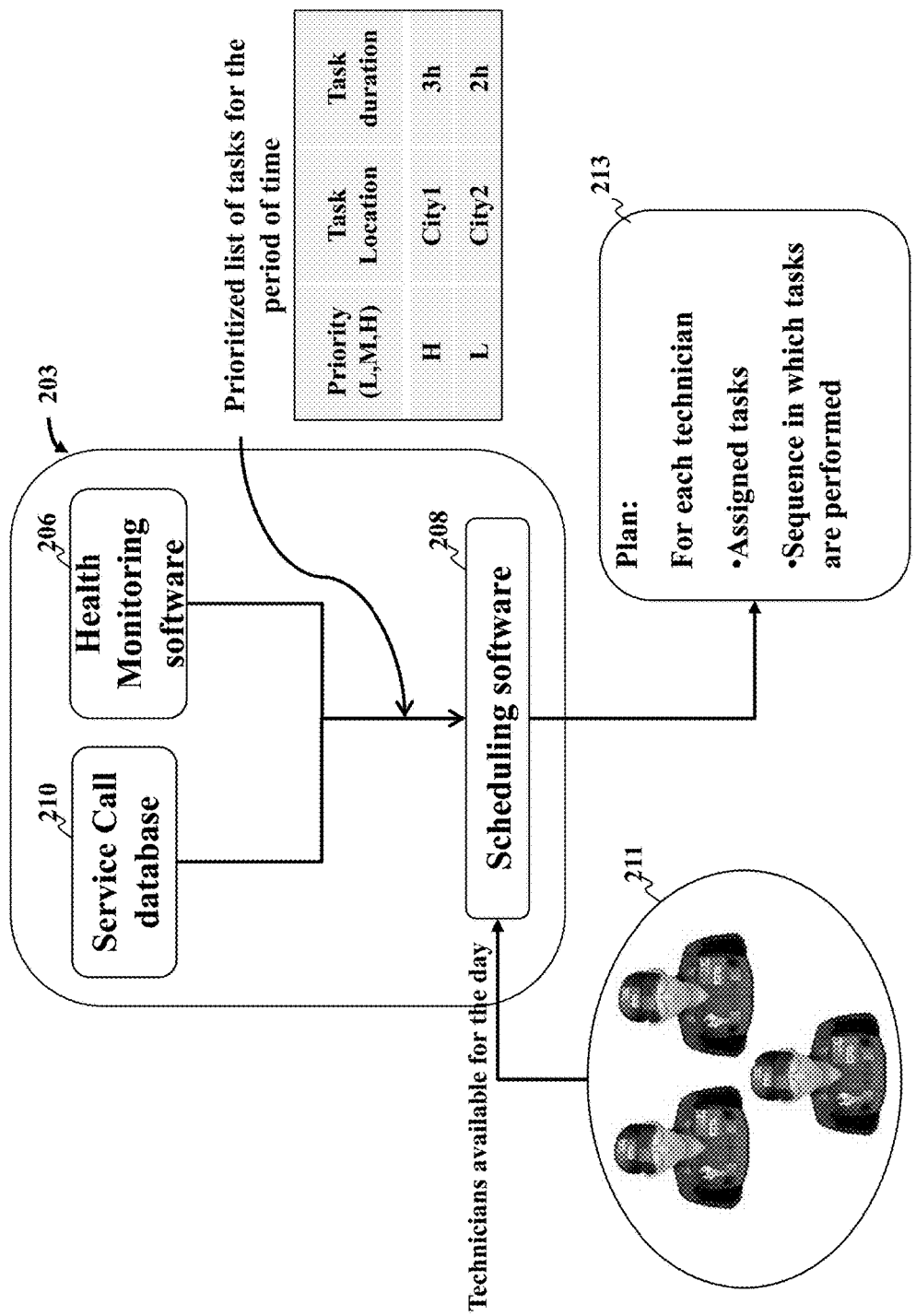
FIG. 2A is a schematic illustrating a maintenance scheduling method, according to some embodiments of the present disclosure.

FIG. 2A is a schematic illustrating a maintenance scheduling method, in accordance with some embodiments of the present disclosure. The maintenance scheduling method 203 may include Maintenance scheduling software 208 that may be in communication with other types of software, such as Health Monitoring software 206. The Maintenance scheduling software 208 may be in communication with other types of software such as service center database 210 which logs all the service requests that are obtained from the installation locations.

Maintenance scheduling software 208 can be in communication with a workforce 211 by way of wireless communication, GPS, Email/texting, etc. Further, the Maintenance scheduling software 208, in accordance with the embodiments of the present disclosure, is capable of formulating a Plan 213, which includes developing and determining a service schedule for the workforce, among other things.

Figure 2B:
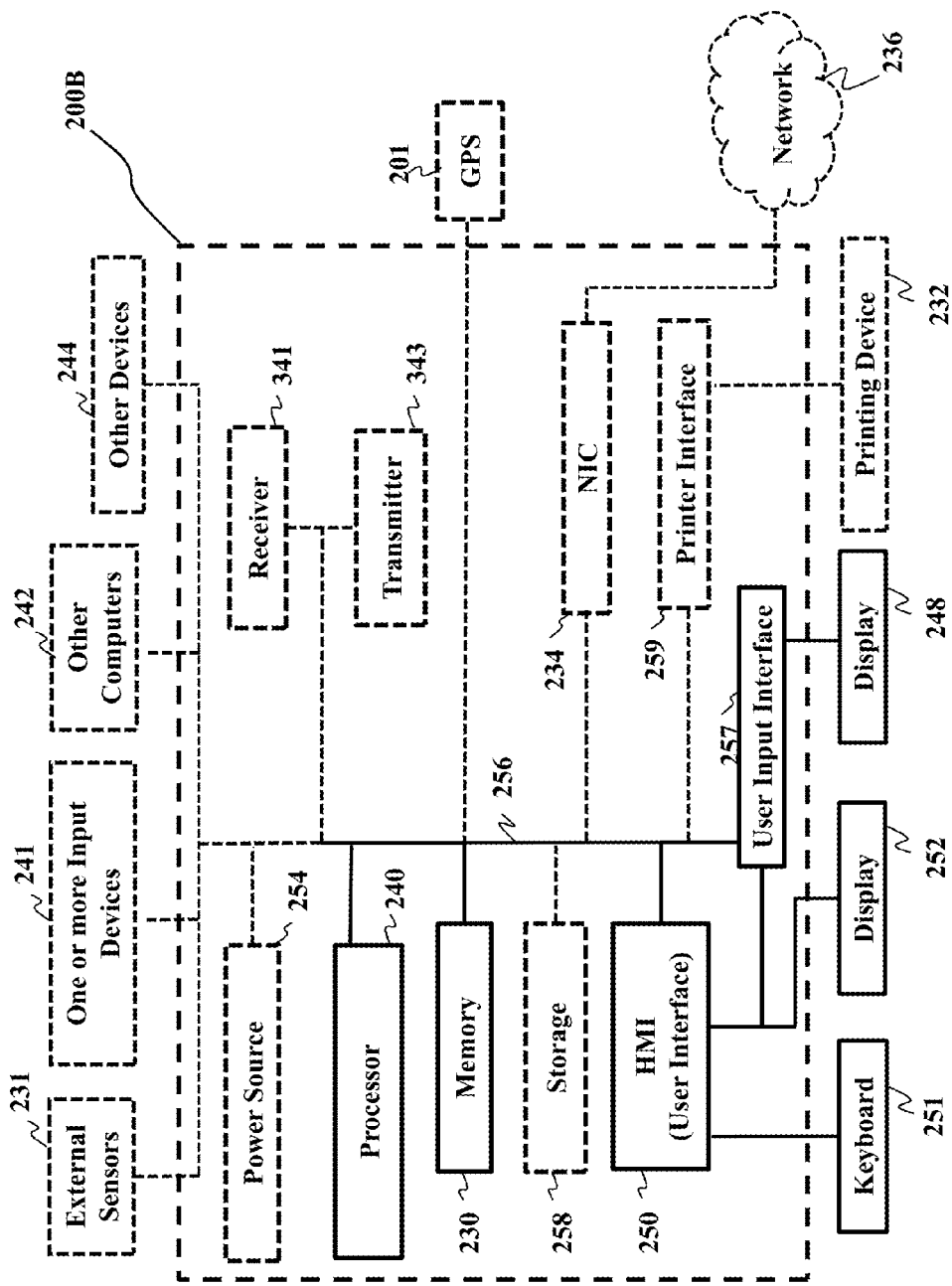
FIG. 2B is a block diagram of a contemplated computer system, according to some embodiments of the present disclosure.

FIG. 2B is a block diagram of a computer system of the method contemplated, in accordance with some embodiments of the present disclosure. The computer system 200B can optionally in communication with a GPS system 201 and can store potential collected data from workers in the memory 230 that is processed by the processor 240 of the computer 200B. The computer system 200B includes a human machine interface or user interface 250 that can connect the computer system to a keyboard 251 and display device 252. The computer system 200B can be linked through the bus 256 to a display interface 257 adapted to connect the system 200B to a display device 248, wherein the display device 248 can include a computer monitor, camera, television, projector, or mobile device, among others.

The computer system 200B can include a power source 254, depending upon the application the power source may be optionally located outside of the computer system. The processor 240 maybe one or more processors that can be configured to execute stored instructions, as well as be in communication with the memory 230 that stores instructions that are executable by the processor 240. The processor 240 can be a single core processor, a multi-core processor, a computing cluster, or any number of other configurations. The processor 240 is connected through a bus 256 to one or more input and output devices. The memory 230 can include random access memory (RAM), read only memory (ROM), flash memory, or any other suitable memory systems.

Still referring to FIG. 2B, the computer system 200B can also include a storage device 258 adapted to store supplementary data and/or software modules used by the auto-processor 240. For example, the storage device 258 can store historical data relating to worker data, machine servicing data, and historical data, among other things. The storage device 258 can include a hard drive, an optical drive, a thumb-drive, an array of drives, or any combinations thereof.

Still referring to FIG. 2B, a printer interface 259 can also be connected to the computer system 200B through the bus 256 and adapted to connect the computer system 200B to a printing device 232, wherein the printing device 232 can include a liquid inkjet printer, solid ink printer, large-scale commercial printer, thermal printer, UV printer, or dye-sublimation printer, among others. A network interface controller (NIC) 234 is adapted to connect the computer system 200B through the bus 256 to a network 236. The image data or related image data, among other things, can be rendered on a display device, imaging device, and/or printing device via the network 236.

Still referring to FIG. 2B, the worker data, machine servicing data and historical data or related image data, among other things, can be transmitted over a communication channel of the network 236, and/or stored within the computer's storage system 258 for storage and/or further processing. Further, worker data, machine servicing data and historical data or related image data may be received wirelessly or wired from a receiver 241 or transmitted via a transmitter 243 wirelessly or wire, the receiver 241 and transmitter 243 are both connected to the computer system 200B through the bus 256.

The computer system 200B may be connected to external sensors 231, one or more input devices 241, other computers 242 and other devices 244. The external sensors 231 may include motion sensors, inertial sensors, a type of measuring sensor, etc. The external sensors 231 may include sensors for, speed, direction, air flow, weather conditions, etc. The input devices 241 can include, for example, a keyboard, a scanner, a microphone, a stylus, a touch sensitive pad or display.

Figure 3B:
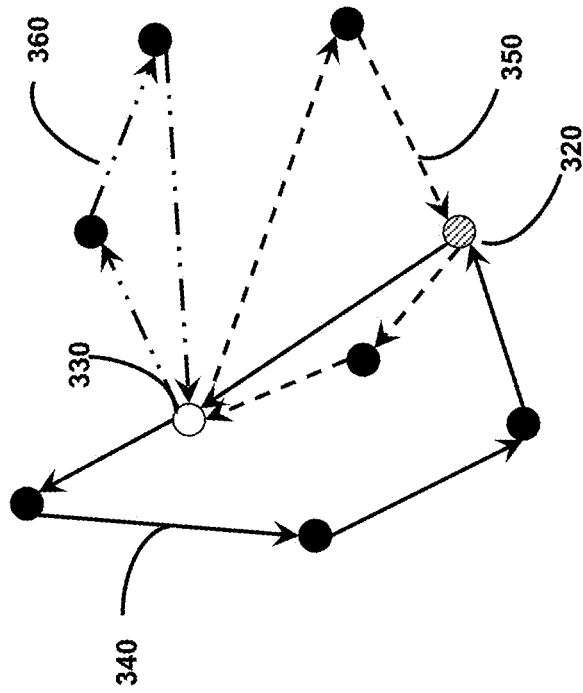
FIG. 3B is a schematic illustrating a maintenance scheduling method, according to some embodiments of the present disclosure.
Figure 3A:
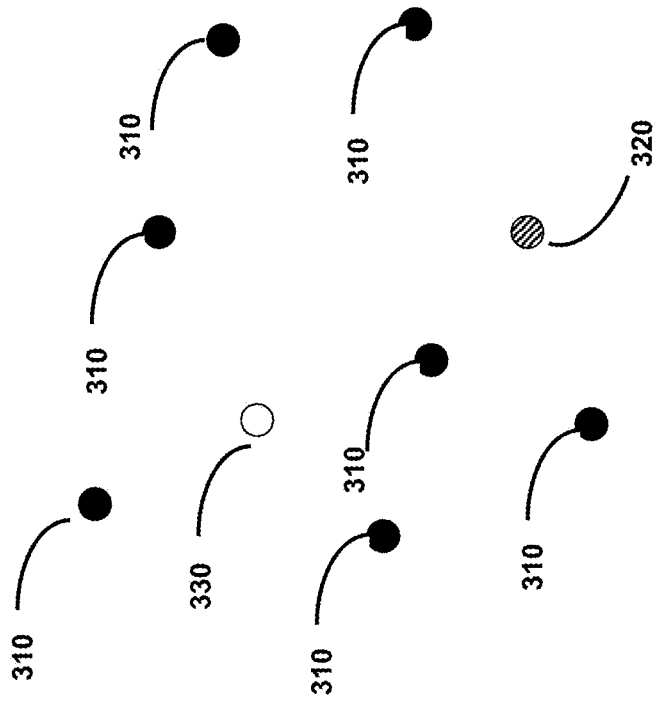
FIG. 3A is a schematic illustrating an aspect of a method including assigning of jobs to workers, in accordance with some embodiments of the present disclosure.

FIG. 3A is a schematic illustrating an aspect of a method including assigning of jobs to workers, in accordance with some embodiments of the present disclosure. FIG. 3A shows jobs that require a single worker as solid circles 310 and jobs that requires two workers as the hashed circle 320 and an un-solid circle as a central facility location 330. Character reference 320 is a representation of a maintenance job requiring two maintenance workers.

FIG. 3B is a schematic illustrating an aspect of a method including assigning of jobs to workers and routing of the workers representing the sequence in which the jobs are to be performed, in accordance with some embodiments of the present disclosure. The route 340 represents a sequence of jobs that are visited by a maintenance worker starting from the central facility location 330 and visiting a set of jobs before ending at the central facility. The sequence in which the jobs are performed are indicated by the arrows on the arcs in the route 340. The route 340 also includes a visit to the job 320, requiring two maintenance workers, as the fourth job in the route. The route 350 represents the set of jobs performed by a second maintenance worker who also services the job 320 requiring two maintenance workers. The sequence in which the jobs are performed are as indicated by the arrows in the route 350. The route 360 represents the sequence of jobs as indicated by the arrows performed by a third maintenance worker. The route 360 only contains jobs that require a single worker and has no overlap with routes of other maintenance workers.

Figure 4:
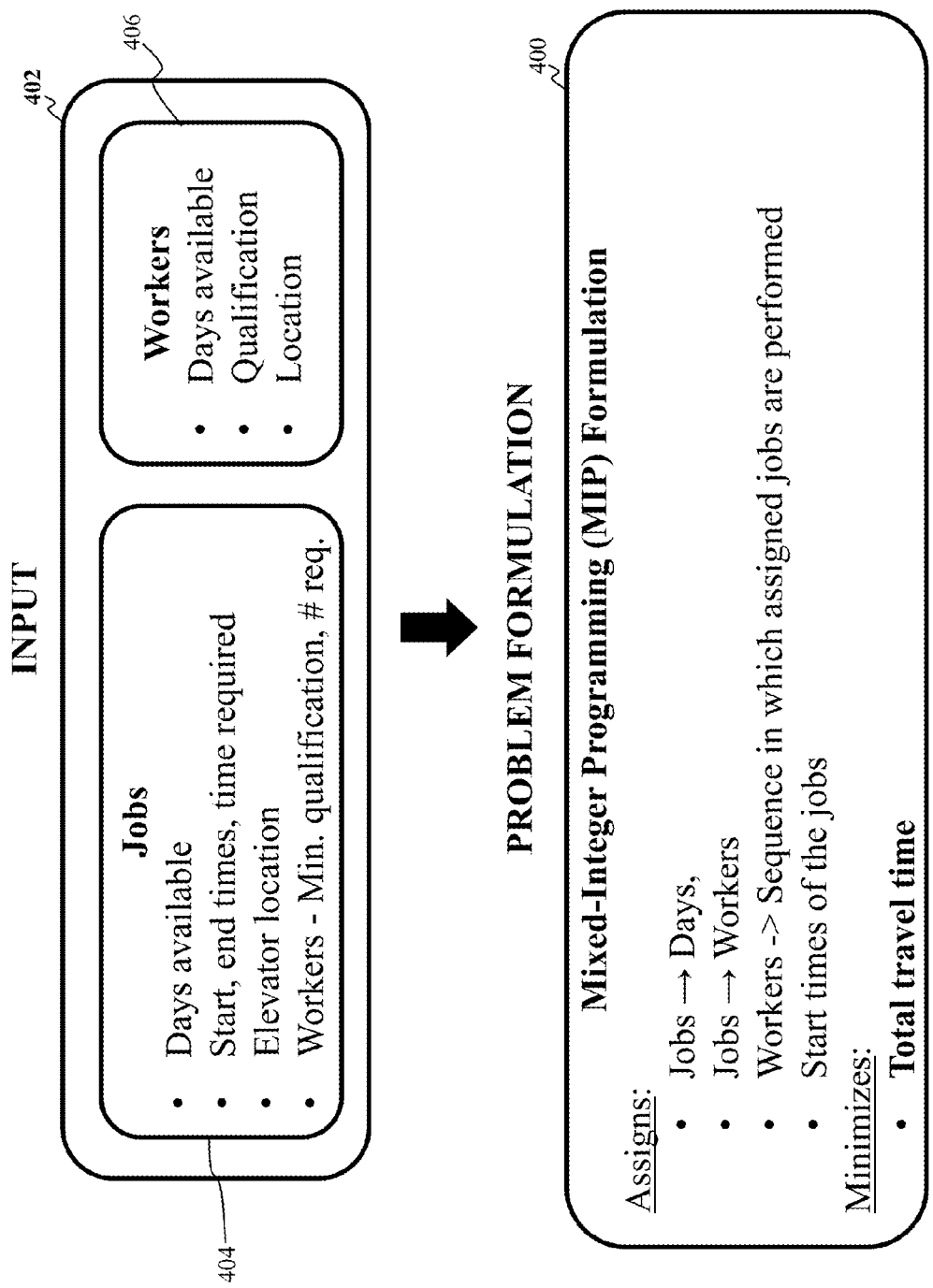
FIG. 4 is a block diagram of a method which illustrates formulating a scheduling problem for a workforce, along with input information needed to formulate the scheduling problem, according to some embodiments of the present disclosure.

FIG. 4 is a block diagram of a method which illustrates formulating a scheduling problem for a workforce, along with input information needed to formulate the scheduling problem, according to embodiments of the present disclosure.

The input information 402 needed to address formulating a service schedule for a workforce includes several variables, for example, job related information 404 and worker related information 406. The formulation of the method 400 which jointly includes constraints that models the assignments of jobs to days, assignment of required number of workers to perform the job, the sequence in which the jobs assigned to a worker on a day are performed, the times at which the jobs are performed and the scheduling is performed so as to minimize the total travel time. The formulation 400 is cast as a mixed integer program.

Figure 5:
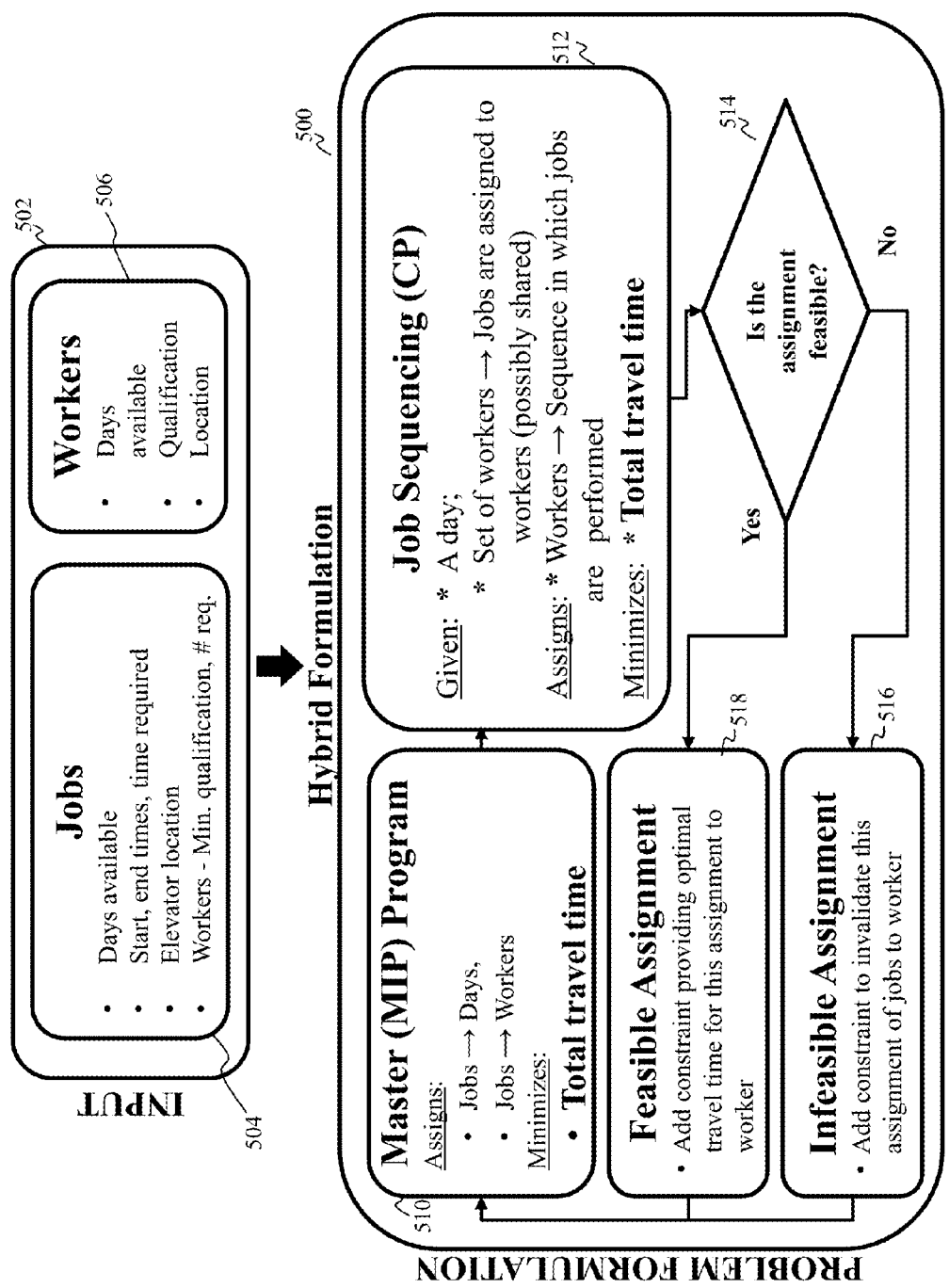
FIG. 5 is a block diagram of a method which illustrates formulating a scheduling problem for a workforce using a constraint programming method, along with input information needed to formulate the scheduling problem, according to some embodiments of the present disclosure.

FIG. 5 is a block diagram of a method which illustrates formulating a scheduling problem for a workforce using constraint programming method, along with input information needed to formulate the scheduling problem, according to embodiments of the present disclosure.

The input information 502 needed to address formulating a service schedule for a workforce includes several variables, for example, job related information 504 and worker related information 506. The formulation of the method 500 consists of a master program 510 and a subroutine which is solved using constraint programming 512. The master program 510 is formulated as a mixed integer program that assigns the jobs to days and workers as to minimize the total travel time. Given such an assignment of jobs, the constraint programming method 512 determines the sequence in which the jobs assigned to each worker are performed and also ensures that the scheduling respects that jobs requiring multiple workers are performed at appropriate time. If the constraint programming method 512 yields an optimal schedule 514 then the information on travel time required to complete the sequence of jobs is added 518 to the master problem. If the constraint programming method determines that the sequence of jobs cannot be feasible scheduled 514 then the information on infeasibility is added 516 to the master problem.

Figure 6:
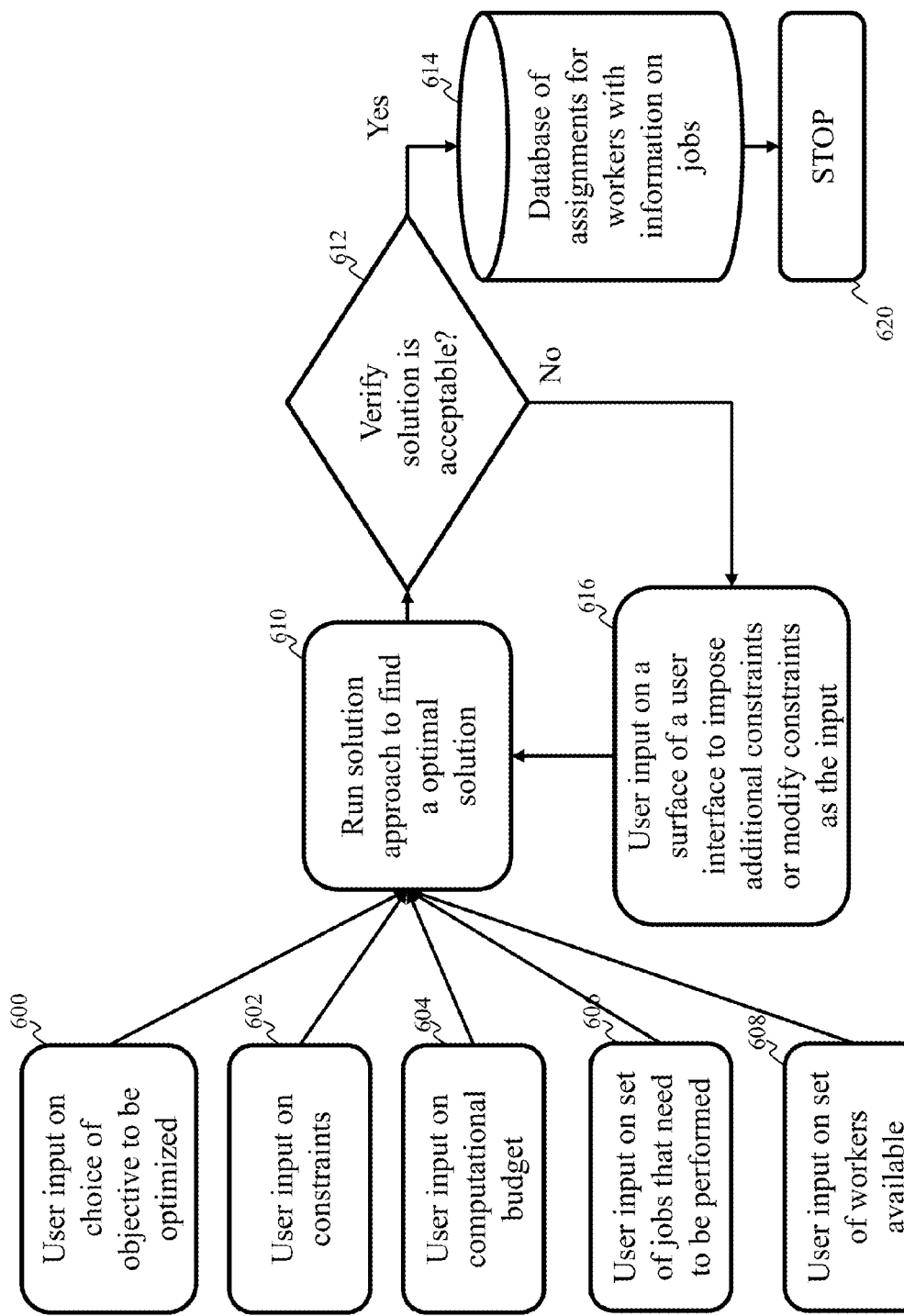
FIG. 6 is a block diagram of a method which illustrates a workflow for obtaining input information needed to formulate the problem for a workforce, solving the problem, verifying the acceptability of solution and storing the obtained solutions for later use, according to some embodiments of the present disclosure.

FIG. 6 is a block diagram of a method which illustrates a workflow for obtaining input information needed to formulation the problem for a workforce, solving the problem, verifying the acceptability of solution and storing the obtained solutions for later use, according to embodiments of the present disclosure.

The input information for the method consists of choice of objective function 600 to be optimized; constraints on the problem 602 that the user desired to be imposed; the computational budget 604 for performing the scheduling; the set of jobs 606 that are chosen to be scheduled; and the set of workers 608 that are determined by the user to be available for performing the jobs. The input is used to formulate and solve 610 the scheduling problem. The obtained solution is verified 612 by the user that it can be executed by the workforce. The verification is required since the user may not specify all the constraints apriori or constraints are discovered after inspection of the solution. The solution if acceptable 614 is stored in a database for future use and the procedure terminates 620. If the solution is not acceptable 614 then additional constraints are added 616 to the formulation and the procedure is repeated. If the constraints are deemed to be overly stringent then the constraints are modified 616 and the solution process is repeated.

Figure 7:
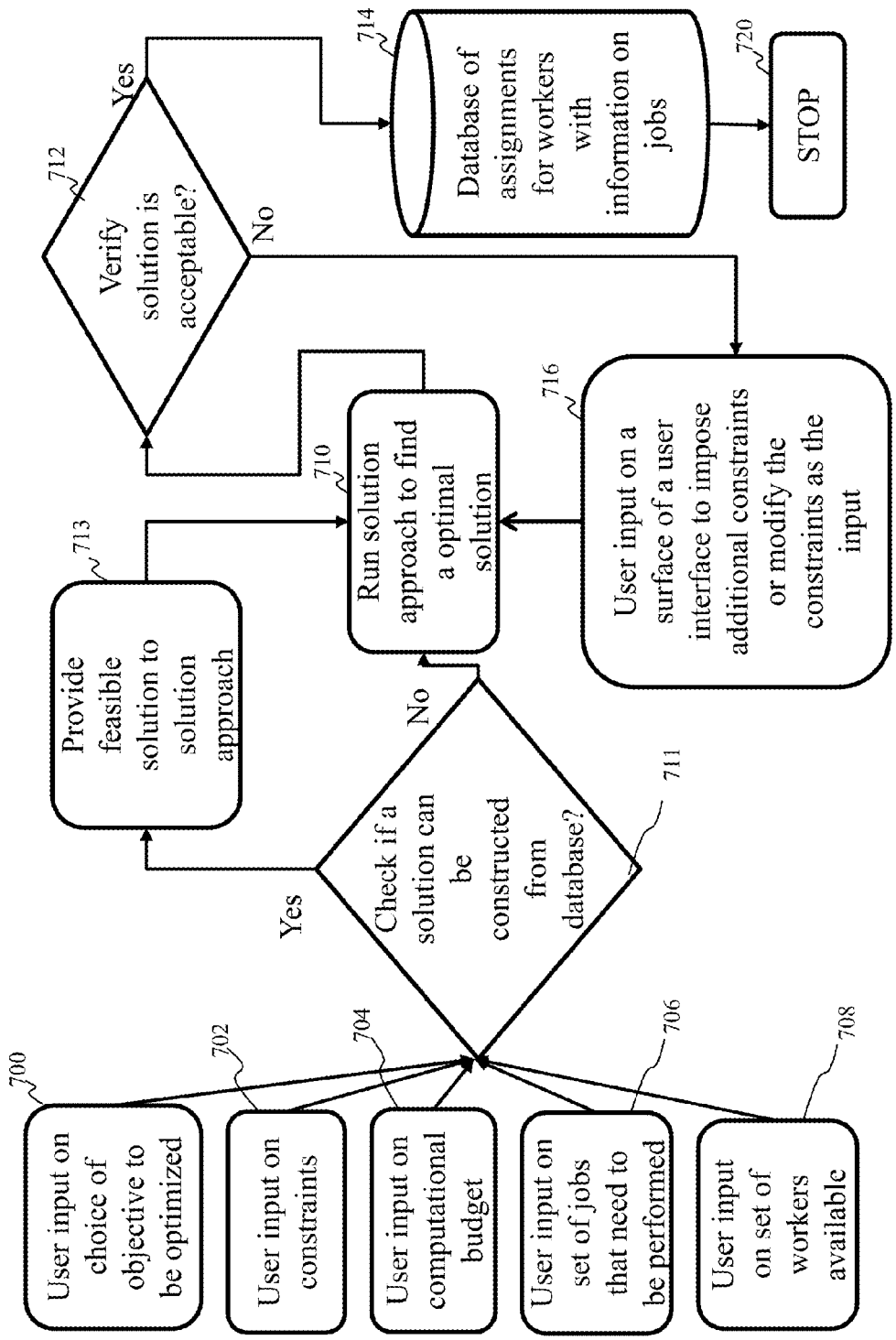
FIG. 7 is a block diagram of a method which illustrates a workflow for obtaining input information needed to formulate the problem for a workforce, utilizing the database of solutions to construct a feasible schedule, solving the problem, verifying the acceptability of solution and storing the obtained solutions for later use, according to some embodiments of the present disclosure.

FIG. 7 is a block diagram of a method which illustrates a workflow for obtaining input information needed to formulation the problem for a workforce, utilizing the database of solutions to construct a feasible schedule, solving the problem, verifying the acceptability of solution and storing the obtained solutions for later use, according to embodiments of the present disclosure.

The input information for the method consists of choice of objective function 700 to be optimized; constraints on the problem 702 that the user desired to be imposed; the computational budget 704 for performing the scheduling; the set of jobs 706 that are chosen to be scheduled; and the set of workers 708 that are determined by the user to be available for performing the jobs. The input information is used to check if a feasible can be constructed 711 using the schedules in the database. If a feasible schedule can be constructed 713 this is provided to the solution process as an initial solution. The input from the user and possible feasible solution, is used to formulate and solve 710 the scheduling problem. The obtained solution is verified 712 by the user that it can be executed by the workforce. The verification is required since the user may not specify all the constraints apriori or constraints are discovered after inspection of the solution. The solution if acceptable 714 is stored in a database for future use and the procedure terminates 720. If the solution is not acceptable 714 then additional constraints are added 716 to the formulation and the procedure is repeated. If the constraints are deemed to be overly stringent then the constraints are modified 716 and the solution process is repeated.

Figure 8:
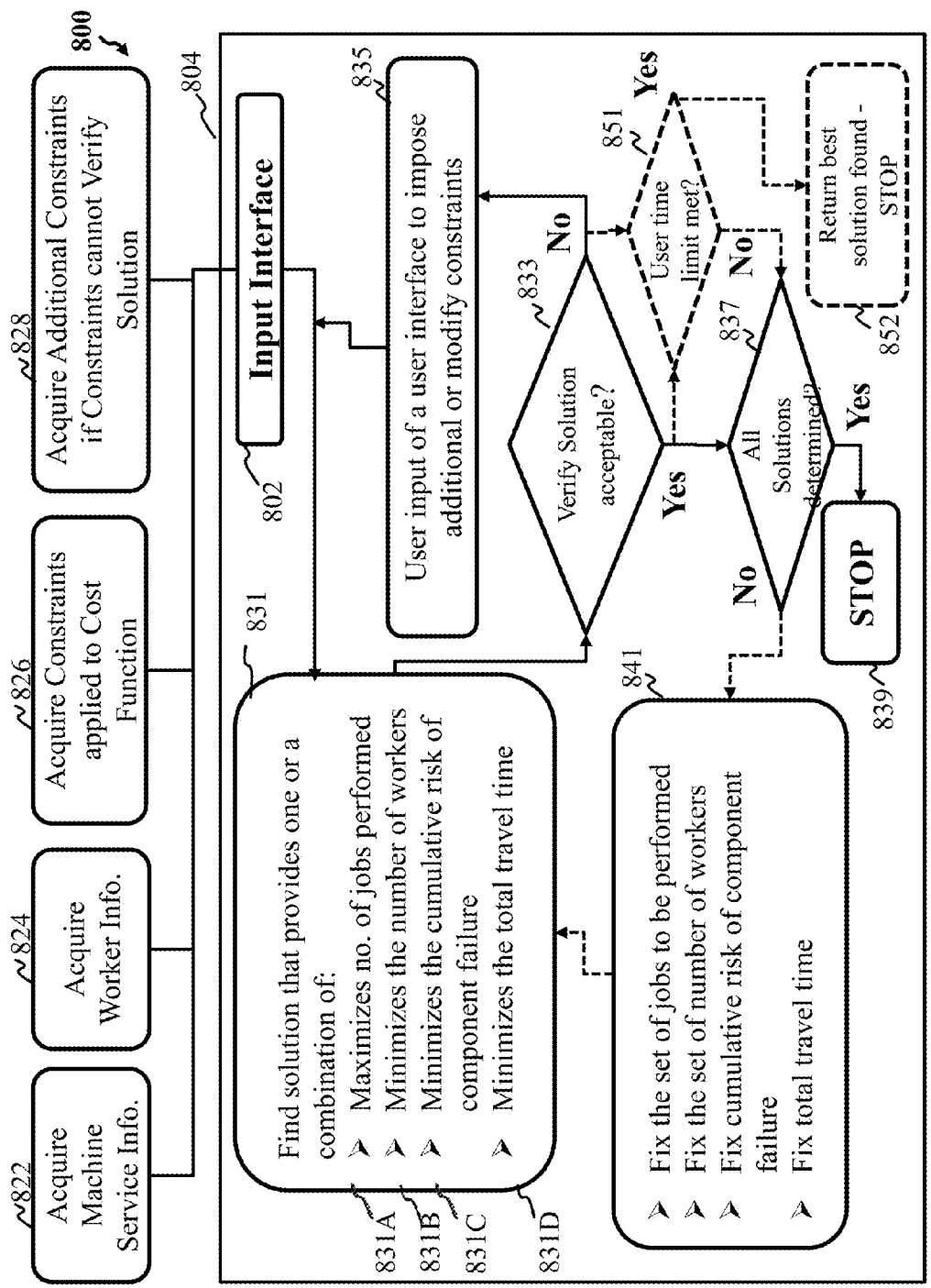
FIG. 8 is a block diagram of a method which illustrates a preferred workflow for determining a schedule for the workforce including input information needed to formulation the problem for a workforce and the sequence of optimization problems solved that ensures that a feasible schedule is obtained, according to some embodiments of the present disclosure.

FIG. 8 is a block diagram of a method which illustrates a preferred workflow for determining a schedule for the workforce including input information needed to formulation the problem for a workforce and the sequence of optimization problems solved that ensures that a feasible schedule is obtained, according to embodiments of the present disclosure.

However, FIG. 8 includes a user set time limit 851 that can be used after the verifying if the solution is or is not acceptable step 833. For example, the user set time limit 851 can be incorporated into the method 800 as a way to return the best solution found step 852 within the user set time limit. It is contemplated the user set time limit could be incorporated along another process step within method 800, besides after step 833. FIG. 8 provides at least one example merely for illustration purposes only.

Method 800 of FIG. 8 is similar to that of FIG. 1, including acquiring machine service information 822 via at least one input interface 802, for each service, by the computer 804, wherein the computer 804 is in communication with the at least one input interface 802. The method 800 can include at least one of machine service information 822, worker information 824, constraints 826 previously stored in the tangible computer readable recordable medium or memory of the computer 804 and additional constraints 828. Further, step 831 includes finding a solution that provides one or a combination of: maximizes the number of jobs performed 831A; minimizes the number of workers 831B, minimizes the cumulative risk of the component failure 831C or minimizes the total travel 831D, wherein an optimization of the cost function is subject to the constraints.

Step 835, includes that if the constraints cannot verify at least one acceptable solution, then a user, via the at least one user interface can impose additional constraints 828. For example, additional constraints may be required in situations when not all constraints are included in the formulation due to their complexity or are revealed to the user after the solution has been obtained or that the constraints need to be modified to render the problem feasible. Otherwise, if the constraints are able to verify the at least one acceptable solution, then either more solutions may be determined Step 837 or the process can stop at step 839. Step 837 determines if the initial request for find a certain number of solutions has been satisfied. If not, the verified acceptable solution is fixed 841 and the process restarts to process the remaining requested solutions in step 831.

Figure 9:
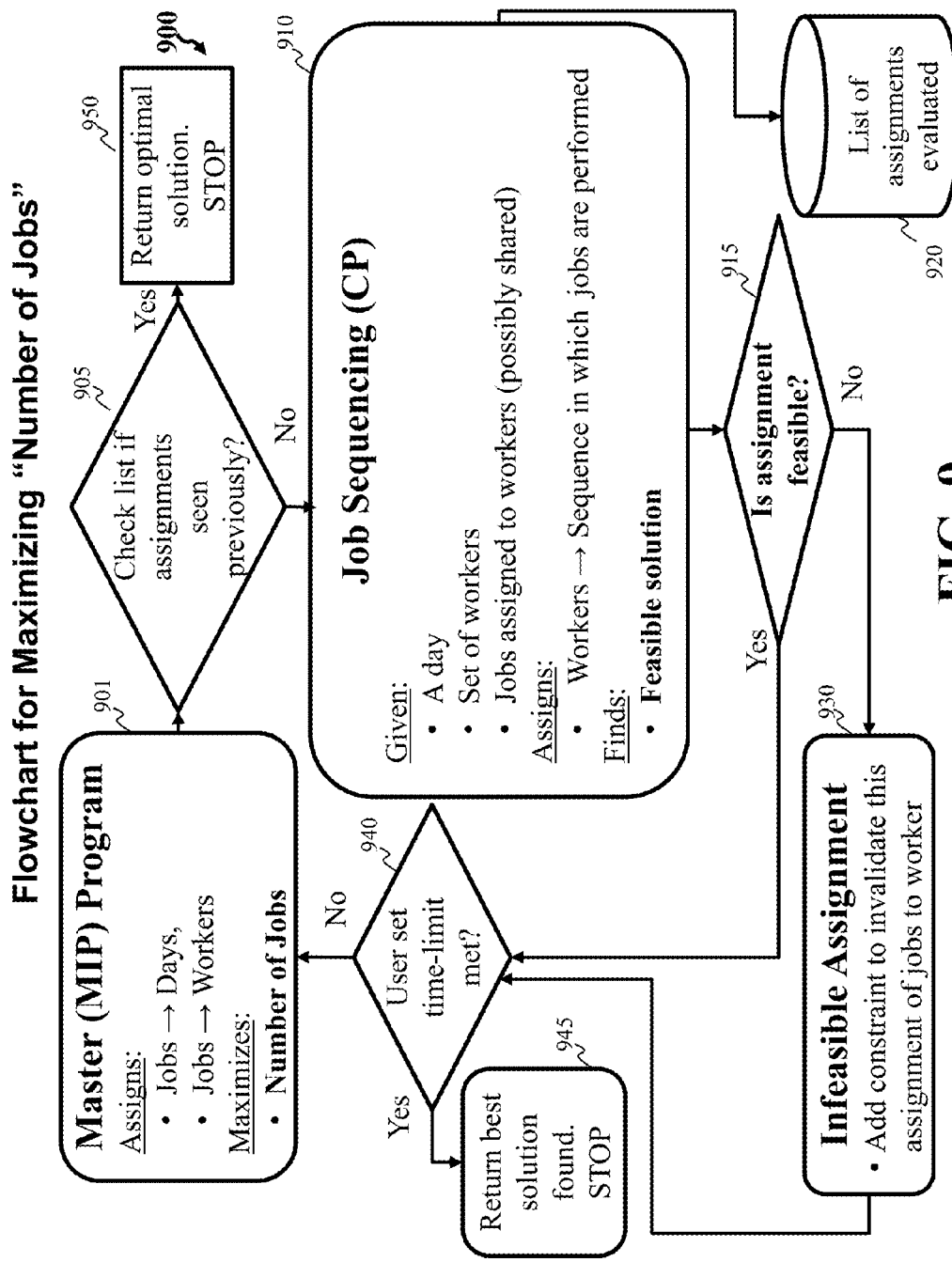
FIG. 9 is a block diagram of the flowchart of the method for maximizing the number of jobs that can scheduled, according to some embodiments of the present disclosure.

FIG. 9 is a block diagram of the flowchart of the method 900 for maximizing the number of jobs that can scheduled, according to embodiments of the present disclosure. The user defined input is used to formulate a master program 901 wherein a mixed integer formulation identifies the set of jobs to be performed and assigns the set of jobs to days and workers. The master program 901 determines the optimal solution that maximizes the number of jobs. The solution is checked to see if all the assignments have been previously seen in a set of assignments 920 that is maintained by the method. If the assignments have been seen then the procedure terminates with an optimal solution 950. If not, the assignments that have not been seen are solved using a constraint programming method 910.

The constraint programming method 910 of FIG. 9 determines a feasible sequence or infers infeasibility of job assignments for the workers. If the assignments lead to feasible schedule 915, the method stores the information in list of assignments evaluated 920 and proceeds to check of the user-set time limit is satisfied 940. If the time-limit has not been exceeded the master program 901 is resolved. If the assignments are infeasible the information on infeasible set of jobs is provided 930 to the master program 901. The method attempts to find another assignment 901 provided that the user specified time limit has not been exceeded 940. If the user specified time limit is exceeded then the method terminates 945 with the best solution found.

Figure 10:
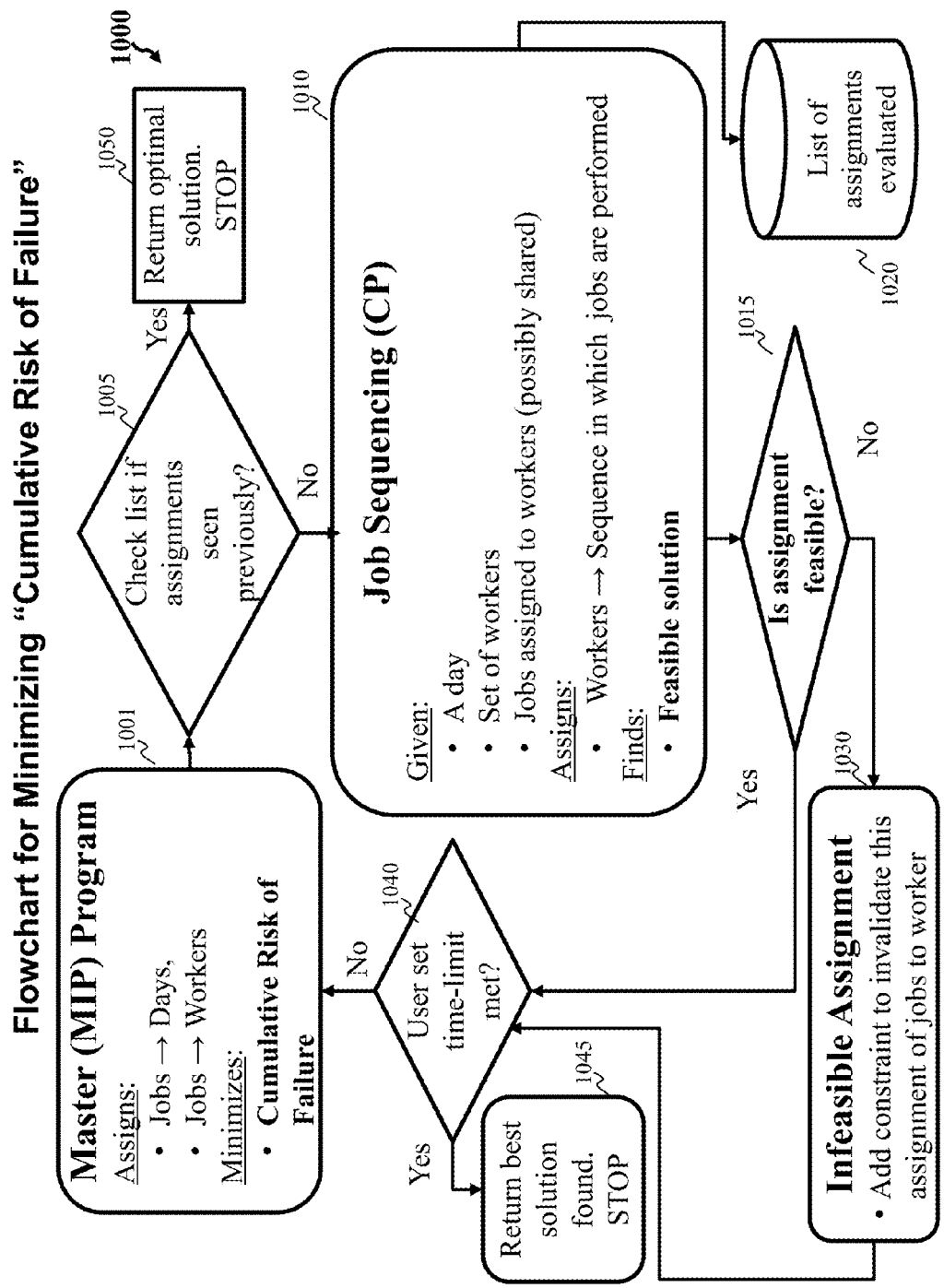
FIG. 10 is a block diagram of the flowchart of the method for minimizing the cumulative risk of failure by identifying a set of jobs that can be feasibly scheduled, according to some embodiments of the present disclosure.

FIG. 10 is a block diagram of the flowchart of the method 1000 for minimizing the cumulative risk of failure by identifying a set of jobs that can be feasibly scheduled, according to embodiments of the present disclosure. The user defined input is used to formulate a master program 1001 wherein a mixed integer formulation identifies the set of jobs to be performed and assigns the set of jobs to days and workers. The master program 1001 determines the optimal solution that minimizes the cumulative risk of failure. The solution is checked to see if all the assignments have been previously seen in a set of assignments 1020 that is maintained by the method. If the assignments have been seen then the procedure terminates with an optimal solution 1050. If not, the assignments that have not been seen are solved using a constraint programming method 1010.

The constraint programming method 1010 of FIG. 10 determines a feasible sequence or infers infeasibility of job assignments for the workers. If the assignments leads to feasible schedule 1015, the method stores the information in list of assignments evaluated 1020 and proceeds to check of the user-set time limit is satisfied 1040. If the time-limit has not been exceeded the master program 1001 is resolved. If the assignments are infeasible the information on infeasible set of jobs is provided 1030 to the master program 1001. The method attempts to find another assignment 1001 provided that the user specified time limit has not been exceeded 1040. If the user specified time limit is exceeded then the method terminates 1045 with the best solution found.

Figure 11:
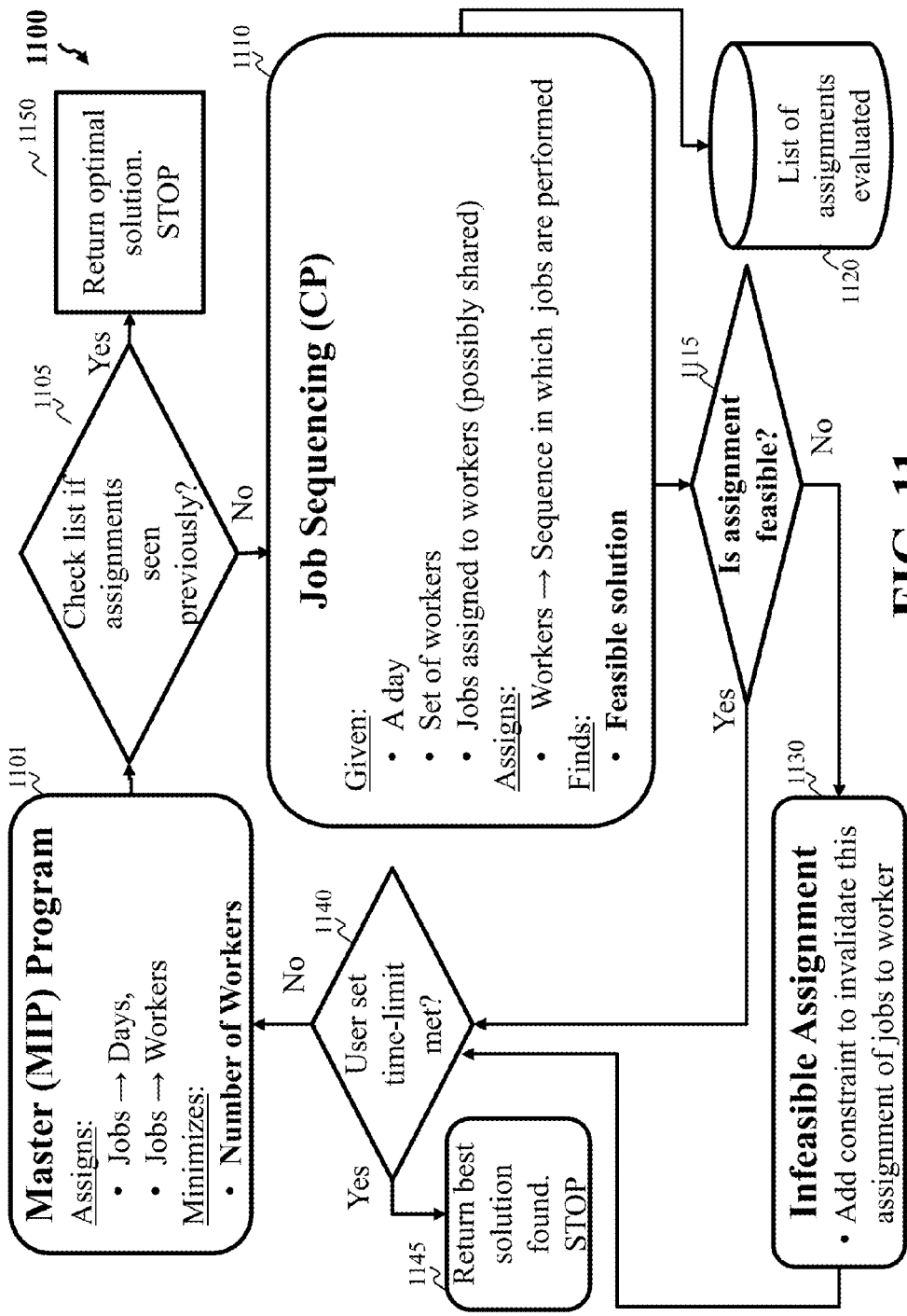
FIG. 11 is a block diagram of the flowchart of the method for minimizing the number of workers required to perform the service on the jobs, according to some embodiments of the present disclosure.

FIG. 11 is a block diagram of the flowchart of the method 1100 for minimizing the number of workers required to perform the service on the job, according to embodiments of the present disclosure. The user defined input is used to formulate a master program 1101 wherein a mixed integer formulation assigns the set of jobs to days and workers. The master program 1101 determines the optimal solution that minimizes the number of workers. The solution is checked to see if all the assignments have been previously seen in a set of assignments 1120 that is maintained by the method. If the assignments have been seen then the procedure terminates with an optimal solution 1150. If not, the assignments that have not been seen are solved using a constraint programming method 1110.

The constraint programming method 1110 of FIG. 11 determines a feasible sequence or infers infeasibility of job assignments for the workers. If the assignments leads to feasible schedule 1115, the method stores the information in list of assignments evaluated 1120 and proceeds to check of the user-set time limit is satisfied 1140. If the time-limit has not been exceeded the master program 1101 is resolved. If the assignments are infeasible the information on infeasible set of jobs is provided 1130 to the master program 1101. The method attempts to find another assignment 1101 provided that the user specified time limit has not been exceeded 1140. If the user specified time limit is exceeded then the method terminates 1145 with the best solution found.

Figure 12:
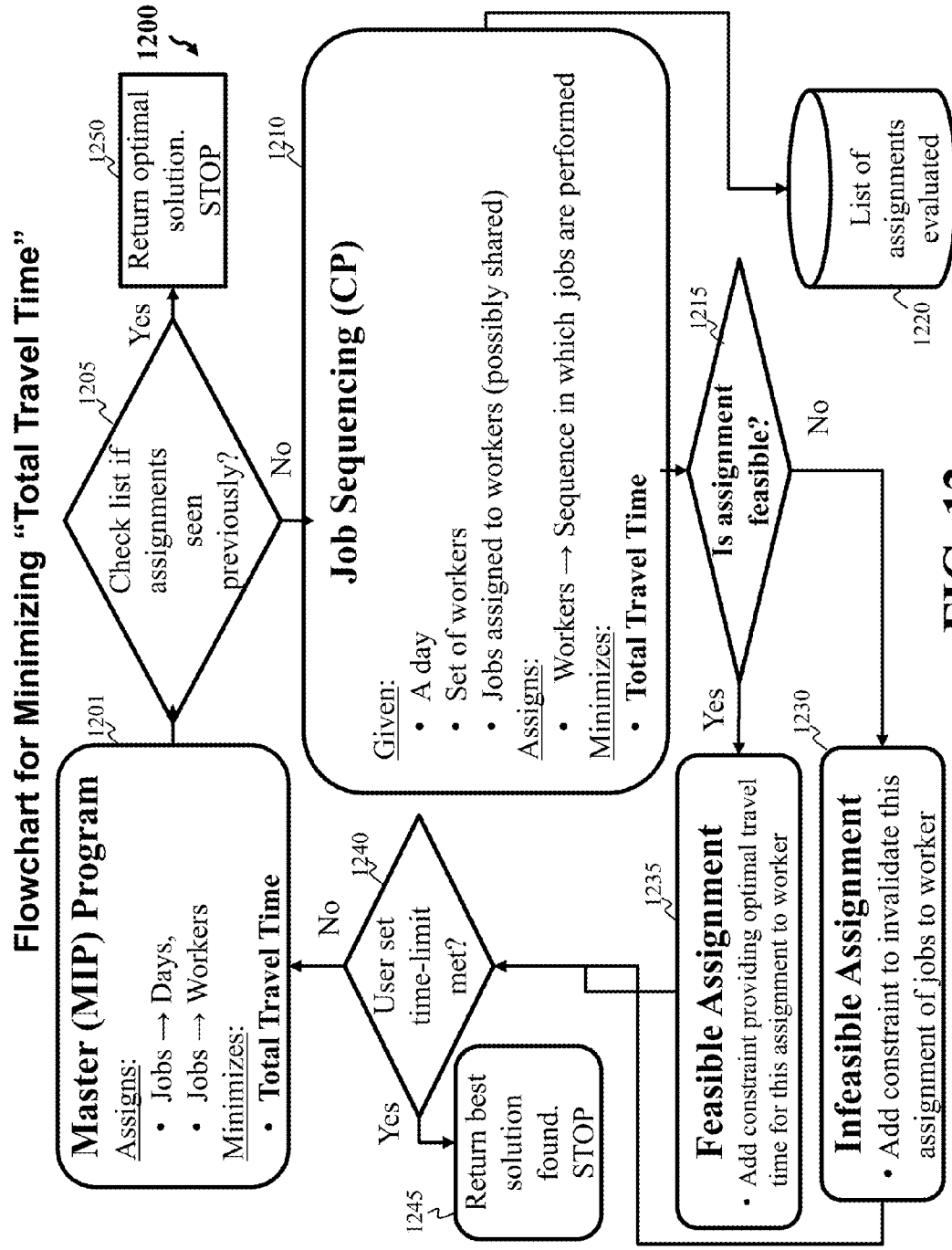
FIG. 12 is a block diagram of the flowchart of the method for minimizing the travel time required to perform the service on the jobs, according to some embodiments of the present disclosure.

FIG. 12 is a block diagram of the flowchart of the method 1200 for minimizing the travel time required to perform the service on the jobs, according to embodiments of the present disclosure. The user defined input is used to formulate a master program 1201 wherein a mixed integer formulation assigns the set of jobs to days and workers. The master program 1201 determines the optimal solution that minimizes the travel time for performing the jobs. The solution is checked to see if all the assignments have been previously seen in a set of assignments 1220 that is maintained by the method. If the assignments have been seen then the procedure terminates with an optimal solution 1250. If not, the assignments that have not been seen are solved using a constraint programming method 1210.

The constraint programming method 1210 of FIG. 12 determines a feasible sequence or infers infeasibility of job assignments for the workers. If the assignments leads to feasible schedule 1215, the method stores the information in list of assignments evaluated 1220, the information on the travel time for the feasible assignment is provided 1235 to the master program, and the method proceeds to check of the user-set time limit is satisfied 1240. If the time-limit has not been exceeded the master program 1201 is resolved. If the assignments are infeasible the information on infeasible set of jobs is provided 1230 to the master program 1201. The method attempts to find another assignment 1201 provided that the user specified time limit has not been exceeded 1240. If the user specified time limit is exceeded then the method terminates 1245 with the best solution found.

Some of the embodiments of the systems and methods include formulating a scheduling problem of servicing manufactured articles, i.e. machines such as elevators, that utilizes a cost function subject to the set of constraints, in such a way as to improve the technical field of workforce scheduling of servicing machines including elevators, for workforce related management systems. It is noted that elevators are provided or intended as limiting the embodiments of the present disclosure, such that other manufactured articles are considered. For example, some of the embodiments of the systems and methods include the following:

Days

The problem is to schedule workers to elevator maintenance tasks in a time horizon of T days. The set of days D are assumed to have size $|D|=T$ and indexed $\{1, \ldots, T\}$.

Workers/Mechanics

Let W be the set of all mechanics. Each worker $w \in W$ has the following parameters associated with him/her:

D(w): the set of days that the worker is available to do work q(w): the qualification of the worker.

The qualifications are in the set $\{1, \ldots, Q\}$ where it is assumed that the higher the qualification, the more skills the worker has, and so the more maintenance tasks that he/she can be assigned to.

Elevators

Let E be the set of elevators that need service. Each elevator $e \in E$ has the following parameters associated with it:

D(e): the set of days that the elevator is available for service a(e): the start time of the time window in which the elevator must be serviced (in the days that the elevator is available to be serviced)

b(e): the ending time of the time window in which the elevator must be serviced (in the days that the elevator is available to be serviced)

C(e,n): the set of all components in e that require exactly n workers for service $c(e,n,\varepsilon^{thresh})$: the set of components that will be serviced in the planning horizon T that require exactly n workers for service l(e): location of elevator.

The set $c(e,n,\varepsilon^{thresh})$ is determined by the penalty that is associated with not servicing the component in the planning horizon. Each component $c \in C(e,n)$ has a probability of failing $\omega_{e,c}(t)$ and impact of failure $t_{e,c}(t)$, both increasing in time. Define the penalty $p_{c,e}(t)$ of c to be the product of the failure probability times the impact of failure: $p_{c,e}(t)=\omega_{e,c}(t) \cdot t_{e,c}(t)$. The set $c(e,n,\varepsilon^{thresh})$ is determined by setting a threshold $\varepsilon^{thresh}$ and including in $c(e,n,\varepsilon^{thresh})$ those components in C(e,n) that have penalty $p_{c,e}(T) \geq \varepsilon^{thresh}$. For a given $\varepsilon^{thresh}$, the penalty $P(e,\varepsilon^{thresh})$ that is incurred by only serving the jobs in $c(e,n,\varepsilon^{thresh})$, for each n, is $$P(e, \varepsilon^{thresh}) = \sum_{n=1}^{|W|} \left( \sum_{c \in C(e,n) \backslash c(e,n,\varepsilon^{thresh})} P_{c,e}(2T) \right), \quad (1)$$

where the penalty is evaluated at 2T under the assumption that the job is performed at 2T. Finally, the penalty for the entire assignment of mechanics to the set of elevators that will be serviced at a particular threshold, $\varepsilon^{thresh}$, is $$\Pi(\varepsilon^{thresh}) = \sum_{e \in E} P(e, \varepsilon^{thresh}). \quad (2)$$

The choice of the $\varepsilon^{thresh}$ determines the magnitude of this penalty and in a sense measures the risk of failure by ignoring certain items. Ideally, this parameter $\varepsilon^{thresh}$ should not be fixed apriori but determined as part of the optimization. In this formulation we will keep $\varepsilon^{thresh}$ fixed.

Jobs

Let J be the set of all jobs which need to be serviced. Each job j∈J has the following parameters associated with it:

e(j): the elevator that this job is associated with n(j): the number of employees that must be present to work on the job c(j): the set of components in the elevator e(j) that require exactly n(j) employees (we are assuming a fixed $\varepsilon^{thresh}$ so we omit this from the notation)

w(j,d): the probability of failure of components in job j if the job is performed on day d. This parameter allows the probability y of failure to vary by the day.

a(j): the start time of the time window in which the elevator must be serviced (in the days that the elevator is available to be serviced)—equivalent to a(e(j))

b(j): the ending time of the time window in which the elevator must be serviced (in the days that the elevator is available to be serviced)—equivalent to b(e(j))

q(j): the minimum qualification of some employee that must be present when the job is being serviced D(j): the days that the job can be serviced—equivalent to D(e)

l(j): the location of the job—equivalent to l(e(j))

$\tau_j$: the amount of time required to service all components in c(j).

Additionally, between any two jobs j,j'∈J, we define $\tau_{j,j'}$ is the time required to travel from l(j) to l(j').

Assumptions

To simplify the problem representation, we will assume the following.

Assumption 1:

Each day is assumed to consist of 8 work hours.

Assumption 2:

Each worker originates from the service center and must end the work day at the service center, returning prior to the end of the 8 hours. The travel time between the service center and a job j∈J is denoted by $\tau_{oj} = \tau_{jo}$, where the service center is denoted by o.

Assumption 3:

The travel time between jobs j,j'∈J is denoted by $\tau_{jj'} = \tau_{j'j}$. Furthermore, we assume that the triangle inequality is satisfied:

$$\tau_{jj'} + \tau_{j'j''} \geq \tau_{jj''}, \quad \tau_{oj} + \tau_{jj'} \geq \tau_{oj''}$$

Assumption 3 implies that travel times are constant, i.e., do not depend on the time of the day that travel takes place. This assumption may not be satisfied in certain urban environments. Imposing this assumption simplifies the formulation, while relaxing it would require elaborate time measurements of transition times that may depend not only on elevator locations but also types of transportation modes used by different workers.

Assumption 4:

Each job j∈J must be completed within a single work day.

A necessary condition for Assumption 4 to hold is the following set of inequalities, defined for each j∈J:

$$2\tau_{oj} + \tau_j \leq 8 \text{ and } \tau_j \leq b(j) - a(j)$$

The first inequality requires that, for each job, the sum of the travel time to and from the service center together with the time to service the job must be less than or equal to the number of working hours. The second inequality requires that the time to complete the job must be smaller than the time interval over which the job can be serviced on any given day. Assumption 4 is quite restrictive—if either inequality does not hold, then a job may have to be broken into multiple jobs requiring shorter times. For now, we will impose Assumption 4 to obtain a simple formulation.

Decision Variables

The decision variables in the problem are:

$z_{j,d} \in \{0,1\}$—binary variable taking value 1 if job j is performed on day d $x_{w,j,d} \in \{0,1\}$—binary variable taking value 1 if job j∈J is assigned to worker w∈W to be performed on d∈D and 0 otherwise $y_{w,j,j',d} \in \{0,1\}$—binary variable taking value 1 if job j is performed immediately before j' (j≠j') on day d∈D by worker w and 0 otherwise $p_{w,j,d} \in \{0,1\}$—binary variable taking value 1 if j is the first job performed by worker w on day d∈D and 0 otherwise $q_{w,j,d} \in \{0,1\}$—binary variable taking value 1 if j is the last job performed by worker w on day d∈D and 0 otherwise $s_{j,d}$—continuous variable denoting the start time of the job j on day d∈D $t_w^{travel}$—travel time for worker w in performing the assigned jobs.

$v_w \in \{0,1\}$—binary variable taking value 1 if worker w is used.

$u_j \in \{0,1\}$—binary variable taking value 1 if job j is performed.

Constraints

Day Availability Constraints $$z_{j,d} = 0 \quad \forall j \in J, \forall d \in D \backslash D(j) \quad (3)$$

$$x_{w,j,d} = 0 \quad \forall j \in J, \forall w \in W, \forall d \in D \backslash (D(w) \cap D(j)) \quad (4)$$

$$y_{w,j,j',d} = 0 \quad \forall j \in J, \forall w \in W, \forall d \in D \backslash (D(w) \cap D(j) \cap D(j')) \quad (5)$$

$$p_{w,j,d} = 0 \quad \forall j \in J, \forall w \in W, \forall d \in D \backslash (D(w) \cap D(j)) \quad (6)$$

$$q_{w,j,d} = 0 \quad \forall j \in J, \forall w \in W, \forall d \in D \backslash (D(w) \cap D(j)) \quad (7)$$

$$t_{j,d} = 0 \quad \forall j \in J, \forall d \in D \backslash D(j) \quad (8)$$

Equations (4)-(8) enforce the constraints associated with the availability of the jobs and of the workers.

Qualification Constraints $$\sum_{d \in D} \left( \sum_{w \in W: q(w) \geq q(j)} x_{w,j,d} \right) \geq 1 \forall j \in J \quad (9)$$

Inequality (9) requires that at least one worker with a qualification higher than the necessary qualification for a given job is assigned to that job.

Assignment of Each Job to a Set of Workers and a Single Day

The assignment of each job to the proper number of workers to be performed on a single day can be expressed by the following constraint:

$$\sum_{w \in W} x_{w,j,d} = n(j) z_{j,d} \ \forall \ j \in J, \ \forall \ d \in D \tag{10}$$

This requires the following set of constraints on the z variables:

$$\sum_{d \in D} z_{j,d} = 1 \tag{11}$$

Scheduling of Jobs on a Day

The scheduling of the jobs on the day is accomplished using network flow constraints:

$$\sum_{j \in J} p_{w,j,d} \geq x_{w,j',d} \ \forall \ w \in W, \ \forall \ j' \in J, \ \forall \ d \in D \tag{12}$$

$$p_{w,j,d} \leq x_{w,j,d} \ \forall \ w \in W, \ \forall \ j \in J, \ \forall \ d \in D \tag{13}$$

Inequality (12) imposes that, if a job j' is chosen to be performed on day d, then at least one of the jobs must originate from the service center. The summation on the left-hand side includes all jobs but (13) ensures that $p_{w,j,d}=0$ whenever $x_{w,j,d}=0$. The inequality (13) enforces that each worker travels to no more than one of the chosen jobs from the service center. Equality is not imposed in (13) to allow for the possibility that none of the jobs are assigned to the worker w for the day d.

The requirement that the worker end the day at the service center is modeled using the equality:

$$\sum_{j \in J} p_{w,j,d} = \sum_{j \in J} q_{w,j,d} \ \forall \ d \in D, \ \forall \ w \in W \tag{14}$$

Observe that on a day that the worker has no jobs assigned there exists no trip from any job to the service center for that worker.

The following equality models the requirement that the worker w that performs the job j then either travels to another job j' that is chosen to be performed on that day or returns to the service center:

$$p_{w,j,d} + \sum_{j' \in J: j' \neq j} y_{w,j',j,d} = \sum_{j' \in J: j' \neq j} y_{w,j,j',d} + q_{w,j,d} \ \forall \ d \in D, \tag{15}$$

$$\forall \ w \in W, \ \forall \ j \in J$$

Finally, if a job j is assigned to be performed by worker w, then exactly two of the variables $p_{w,j,d}$, $y_{w,j,j',d}$, $y_{w,j',j,d}$, $q_{d,j,d}$ must take a value of 1. This requirement is enforced by the following constraint:

$$p_{w,j,d} + \sum_{j' \in J: j' \neq j} (y_{w,j,j',d} + y_{w,j',j,d}) + q_{w,j,d} = 2 x_{w,j,d} \ \forall \ d \in D, \tag{16}$$

$$\forall \ w \in W, \ \forall \ j \in J.$$

The start time of a job j that is performed as the first job on day d satisfies $$s_{j,d} \geq \tau_{oj} p_{w,j,d} \ \forall d \in D, \forall w \in W, \forall j \in J \tag{17}$$

The start time of a job j that is performed as the last job on day d can be upper bounded as $$s_{j,d} \leq (8 - \tau_j - \tau_{jo}) q_{w,j,d} + 8(1 - q_{w,j,d}) \ \forall d \in D, \forall w \in W, \forall j \in J \tag{18}$$

since the time taken to perform the job is $\tau_j$ while the time to travel to the service center is $\tau_{oj}$. If the job j is indeed the last job, then $q_{w,j,d}=1$ and (18) implies $s_{j,d} \leq (8-\tau_j-\tau_{jo})$. If this is not the case, then (18) reduces to a trivial upper bound of $s_{j,d} \leq 8$ making the inequality redundant.

The start times of a job j' that follows another job j on day d performed by the worker w satisfies $$s_{j',d} \geq s_{j,d} + (\tau_j + \tau_{jj'}) y_{w,j,j',d} - 8(1 - y_{w,j,j',d}) \ \forall d \in D, \forall w \in W, \tag{19}$$

$$\forall j, j' \in J, j \neq j'$$

If the worker does not perform job j before job j', then $y_{w,j,j',d}=0$ and the inequality in (19) requires that $t_{w,j',d} \geq t_{w,j,d}-8$ which holds trivially due to Assumption (1). On the other hand, if $y_{w,j,j',d}=1$, then the start time of job j' is required to be exceed the start time of job j by the time required to complete j and the travel time between the jobs.

The requirement that jobs be performed within certain time limits is imposed using the constraints $$\left. \begin{array}{l} t_{j,d} \geq a(j) z_{j,d} \\ t_{j,d} \leq (b(j) - \tau_j) z_{j,d} \end{array} \right\} \forall \ w \in W, \ \forall \ j \in J \tag{20}$$

Travel Time for Each Worker

The travel time associated with each worker is $$t_w^{travel} = \sum_{j \in J} \sum_{d \in D} \left( \tau_{oj} p_{w,j,d} + \sum_{j' \in J: j' \neq j} \tau_{jj'} y_{w,j,j',d} + \tau_{oj} q_{w,j,d} \right) \tag{21}$$

Number of Workers Used

The number of workers is used is modeled using the constraints $$v_w \geq x_{w,j,d} \ \forall w \in W, \forall j \in J \tag{22}$$

MIP Formulation Minimizing Travel Time

The optimization problem corresponding for minimizing travel time is:

$$\min \sum_{w \in W} t_w^{travel}$$

s.t. (3)-(21).

MIP Formulation Minimizing Number of Workers

The optimization problem corresponding for minimizing number of workers is:

$$\min \sum_{w \in W} v_w$$

s.t. (3)-(22).

MIP Formulation Maximizing Number of Jobs

The optimization problem corresponding for maximizing number of jobs is:

$$\max \sum_{j \in J} u_j$$

s.t. (3)-(10), (12)-(21), $u_j \geq z_{j,d} \ \forall j \in J, \forall d \in D.$ In this formulation the constraint (11) imposing that every job in J is scheduled on some day d is relaxed. This allows the optimization formulation to choose the set of jobs that are performed. In addition, variables $u_j$ are introduced to model whether a particular job j is performed. The constraints impose the condition that $u_j=1 \Leftrightarrow z_{j,d}=1$ for some d.

MIP Formulation Minimizing Cumulative Failure

The optimization problem corresponding for picking jobs that minimize cumulative failure is:

$$\max \sum_{j \in J} \sum_{d \in D} (d \cdot \omega(j,d) \cdot z_{j,d}) + \sum_{j \in J} (T \cdot \omega(j,T) \cdot (1-u_j))$$

s.t. (3)-(10), (12)-(21), $u_j \geq z_{j,d} \ \forall j \in J, \forall d \in D.$ In this formulation the constraint (11) imposing that every job in J is scheduled on some day d is relaxed. This allows the optimization formulation to choose the set of jobs that are performed. In addition, variables $u_j$ are introduced to model whether a particular job j is performed. The constraints impose the condition that $u_j=1 \Leftrightarrow z_{j,d}=1$ for some d. The first term in the objective measures the risk incurred in performing a job j on day d. The second term in the objective provides a penalty for not including a job j in the jobs that are performed $u_j=0$. If a job j is chosen to be performed, then the contribution from the second term is zero for that job.

MIP with Constraint Program (CP) Formulation

The MIP formulation has the drawback that the number of variables and constraints scale quadratically in the number of jobs due to the modeling of the route sequence and scheduling of jobs ($y_{w,j,j',d} \ \forall d \in D, \forall w \in W, \forall j,j' \in J, j \neq j'$). As a consequence, a decomposition approach is necessary in order to reduce the computational costs. A branch, check and cut (BCC) approach is proposed for the scheduling of the workforce. The BCC approach decomposes the optimization problem into a mater problem (refer to FIGS. 5 and 9-12) which aims to assign jobs to workers and days and a subproblem which determines the sequence in which the jobs are performed and the start times for the jobs. This decomposition removes the quadratic growth in problem size since the job scheduling is not included in the master problem. The problem of assigning jobs to workers and the days on which the jobs are performed are modeled as a MIP. This can be thought of as a generalized assignment problem. Since the MIP does not directly model the job sequencing constraints, the feasibility of the generalized assignment problem's solution is not guaranteed. We provide this information during the MIP's branch-and-bound search by invoking a Constraint Programming (CP) solver to determine feasibility of an assignment.

For instance, when the MIP solution algorithm has a feasible solution to the master program (not necessarily feasible) we invoke the CP algorithm to perform the job sequencing to determine feasibility of scheduling jobs. The CP algorithm returns the optimal schedules of the jobs taking into account synchronization between workers if the assignment is feasible. The information on the optimal travel time for a given assignment of jobs is added to the master program as a constraint or cut. If the assignment is infeasible then the CP algorithm returns no solution. We again add a constraint or cut to the master program invalidating the particular assignment of jobs to the workers. Note that even though the overall assignment maybe infeasible, assignments to a subset of the workers may still be feasible. Ideally, the cuts should be added in such a manner that maximizes the information that is included in the master program. This will be crucial to the efficiency of the overall algorithm.

Master Problem—MIP Formulation for Generalized Assignment

The variables in the Generalized Assignment formulation consist of: $x_{w,j,d}$, $z_{j,d}$ and $t_{w,d}^{travel}$, the travel time for worker w on day d. The constraints (3)-(4) are imposed to model the day availability for jobs and workers. Constraints (9)-(11) are added which ensure that jobs are assigned the required number of workers and at least one worker has appropriate qualification for the job. In addition the following constraints are imposed which break the symmetry inherent in the formulation by providing an ordering for the workers. Prior to presenting these constraints, define the following sets $W(q,d)=\{w|d \in D(w), q(w)=q\}$ $J(q,d)=\{j|d \in D(j), q(j)=q\}$ (23)

Based on the definition of the set, impose the following constraints, $t_{w,d}^{travel} \geq t_{w',d}^{travel} \forall w > w': w, w' \in W(q,d), d \in D.$ (24)

Constraint (24) imposes a preference order is provided for such workers by requiring that the travel time for a worker with lower index w must be larger than that for the worker w' with higher index. This is a valid constraint since any two workers $w,w' \in W$ that have the same qualification and are available on day d are indistinguishable from each other.

Further symmetry breaking constraints can be obtained for days on which a set of jobs are available on two different days and the number of workers of each qualification that are available are identical. On these days, we can impose the constraint that the total travel time is higher on the earlier day. This is formulated as:

$$\sum_{w \in W} t_{w,d}^{travel} \geq \sum_{w \in W} y_{w,d'}^{travel} \forall d < d' : |W(q,d)| = |W(q,d')|, \quad (25)$$

$J(q,d) = J(q,d') \forall q.$

The Generalized Assignment can be formulated as, $$\min \sum_{w \in W} \sum_{d \in D(w)} t_{w,d}^{travel} \quad (26a)$$

-continued s.t. $(3) - (4), (9) - (11), (24) - (25)$
$a_x^k x + a_z^k z + a_t^k t^{travel} \leq b^k \forall k \in K$
$x_{w,j,d}, z_{j,d} \in \{0, 1\}, t_{w,d}^{travel} \geq 0$ where $x, z, t^{travel}$ is a vector representation of the set of variables $x_{w,j,d}$, $z_{j,d}$, $t_{w,d}^{travel}$, respectively, and $a_x^k, a_z^k, a_t^k$ are row vector representing the coefficients of the linear constraints in the set K. The set K should provide information on all the possible job assignments to workers on different days. However, the set of such assignments is potentially large and furthermore requires the evaluation of all possible assignments. Instead, we aim to append cuts to the set K as part of the branch-and-bound search process as detailed in the section titled Branch, Check & Cut Algorithm.

The master problem for minimizing the number of workers is posed, $$\min \sum_{w \in W} v_w \quad (26b)$$

s.t. $(3) - (4), (9) - (11), (22), (24) - (25)$
$a_x^k x + a_z^k z + a_t^k t^{travel} \leq b^k \forall k \in K$
$x_{w,j,d}, z_{j,d}, v_w \in \{0, 1\}, t_{w,d}^{travel} \geq 0$ The master problem for maximizing the number of jobs is posed, $$\max \sum_{j \in J} u_j \quad (26c)$$

s.t. $(3) - (4), (9) - (10), (24) - (25)$
$a_x^k x + a_z^k z + a_t^k t^{travel} \leq b^k \forall k \in K$
$u_j \geq z_{j,d} \quad \forall j \in J, \forall d \in D$
$x_{w,j,d}, z_{j,d}, u_j \in \{0, 1\}, t_{w,d}^{travel} \geq 0$ The master problem for minimizing the cumulative failure of jobs is posed, $$\max \sum_{j \in J} \sum_{d \in D} (d \cdot \omega(j, d) \cdot z_{j,d}) + \sum_{j \in J} (T \cdot \omega(j, T) \cdot (1 - u_j)) \quad (26d)$$

s.t. $(3) - (4), (9) - (10), (24) - (25)$
$a_x^k x + a_z^k z + a_t^k t^{travel} \leq b^k \forall k \in K$
$u_j \geq z_{j,d} \quad \forall j \in J, \forall d \in D$
$x_{w,j,d}, z_{j,d}, u_j \in \{0, 1\}, t_{w,d}^{travel} \geq 0$ Constraint Programming (CP) Formulation for Job Sequencing Given an assignment of jobs to a worker w on a workday d, the CP formulation solves for the optimal sequence of jobs that minimizes the total travel time. Let $J(w,d)$ be the set of job assignments to a worker. Let $s_{w,j} \forall j \in J(w,d)$ denote the job that succeeds the job j and $t_j$ denote the start time of the job j. The CP formulation for a single worker is $$\min \sum_{j \in J(w,d)} \tau_{j s_{w,j}} \quad (27)$$

-continued s.t. $s_{w,j} \in J(w, d) \setminus \{j\}$
$\text{AllDifferent}(s_w)$
$t_{w,o} = 0$
$s_{w,o} = j \implies t_{w,j} \geq t_{w,o} + \tau_{oj} \forall j \in J(w, d) \setminus \{o\}$
$s_{w,j} = j' \implies t_{w,j'} \geq t_{w,j} + \tau_{jj'} + \tau_j \forall j \in J(w, d) \setminus \{o\}$
$a(j) \leq t_{w,j} \leq b(j).$ The AllDifferent constraint requires that the collection of values in the variables s define a permutation of the jobs and that $s_j \neq j$. Without loss of generality, the start time for the service center is set to 0. The implications also called as half-reification constraints impose that the start times for job j' should exceed that for j by the time to service j and the travel time between jobs j,j'. A CP solver typically seeks to find an optimal solution (or all optimal solutions), or certify that (27) has no solution. Although the problem in (27) is posed as one of minimizing the travel time when solving the optimization problems in (26b), (26c) or (26d) the CP method is terminated as soon as a feasible solution is obtained.

In the case of workers assigned jobs that require multiple workers, the CP formulation is modified as follows. Given a set of feasible assignments to all workers, define the disjoint sets of workers as $$W_m(d) \forall m = 1, \ldots, \quad (28)$$

$$M \text{ such that} \begin{cases} W_m(d) = \{w \mid J(w, d) \cap J(w', d) \neq \emptyset \text{ for some } w'\} \\ W_m(d) \cap W_{m'}(d) = \emptyset \forall m \neq m' \end{cases}$$

The set $W_m(d)$ denotes the minimal set of workers that have jobs whose start times are inter-dependent. The CP formulation for each such set of workers $W_m(d)$ is, $$\min \sum_{w \in W(d)} \sum_{j \in J(w,d)} \tau_{j s_{w,j}} \quad (29)$$

s.t. $\text{Constraints in}(27) \forall w \in W_m(d)$
$t_{w,j} = t_{w',j} \forall w < w', j \in J(w, d) \cap J(w', d)$ In addition to the constraints in (27), the additional constraint equates the start times of the jobs that require multiple workers. Although the problem in (29) is posed as one of minimizing the travel time when solving the optimization problems in (26b), (26c) or (26d) the CP method is terminated as soon as a feasible solution is obtained.

Cuts for Feasible & Infeasible Assignments

This section describes the cuts that are added to the algorithm once the CP algorithm determines the optimal solution or infeasibility of the given assignment for the single worker and multi-worker cases.

Single Worker

Given an assignment of jobs to a worker $J(w,d)$, we solve the CP formulation in (27) to determine the feasibility or infeasibility of the assignment. When minimizing the total travel time (26a), if the assignment is feasible with optimal objective value $t^*$ then we add the following cut, $$t_{w,d}^{travel} \geq t^* \left( \sum_{j \in J(w,d)} x_{w,d} - |J(w, d)| + 1 \right). \quad (30)$$

Constraint (30) states that the total travel time for worker w is at least $t^*$ when the jobs in J(w,d) are assigned to be performed on day d. Furthermore, for any other set of job assignments that contains J(w,d) (30) is still valid a valid lower bound on the optimal travel time. This is due to the assumption of triangle inequality in Assumption 3. The cut in (30) only provides the optimal value for the particular assignment to worker w and day d. However, the same cut can be applied for all other days and workers $$d' \in \bigcap_{j \in J(w,d)} D(j) \cap D(w'), w' \in W. \quad (31)$$

Thus a single evaluation of the assignment of jobs to a worker on a day can provide information on the optimal travel time for the assignment of the same set jobs or a superset containing the set of jobs for all workers and days. This cut is only added when solving the optimization problem in (26a) [refer FIG. 12]. Th cut in (30) is not added in the case that optimization problems in (26b), (26c) or (26d) is used (also refer FIGS. 9-11).

If the set of job assignments to a worker J(w,d) is infeasible when solving any of the optimization problems in (26) then the following cut is added to invalidate the assignment, $$\sum_{j \in J(w,d)} x_{w,d} \le |J(w, d)| - 1. \quad (32)$$

As in the case of feasible assignment, the cut (32) also invalidates any set of job assignments that contain J(w,d). The validity of this cut again follows from the triangle inequality in Assumption 3. The cut (32) also holds for other days and workers in (31) and thus, a single evaluation can be seen to invalidate a number of other assignments to other workers and days.

Workers with Shared Jobs

The following describe the cuts that are added in the case of set of workers $W_m(d)$ sharing jobs with each other. When minimizing the total travel time (26a), if the set of assignments are all feasible with $t_w^{}$ the optimal travel time for each of the workers $w \in W_m(d)$ then, the following cuts are added $$t_{w,d}^{travel} \ge t_w^{}\left(\sum_{w \in W_m(d)}\sum_{j \in J(w,d)} x_{w,d} - \sum_{w \in W_m(d)} |J(w, d)| + 1\right) \forall\, w \in W_m(d). \quad (33)$$

Observe that the cut is only based on the assignments of jobs to workers whose job start times are inter-dependent and not all the workers. The validity of the formulation follows from the definition of $W_m(d)$. This cut is only added when solving the optimization problem in (26a) (refer FIG. 12). Th cut in (33) is not added in the case that optimization problems in (26b), (26c) or (26d) is used (also refer FIGS. 9-11).

In case the set of assignments is infeasible when solving any of the minimization problems in (26) we add the following cut, $$\sum_{w \in W_m(d)}\sum_{j \in J(w,d)} x_{w,d} \le \sum_{w \in W_m(d)} |J(w, d)| - 1. \quad (34)$$

We also add the cuts in (33), (34) for all other days in which the set of workers are available and set of jobs are available:

$$d' \in \bigcap_{w \in W_m(d)} \left(\bigcap_{j \in J(w,d)} D(j) \cap D(w)\right). \quad (35)$$

Branch, Check and Cut Algorithm

The BCC algorithm for solving the scheduling of the workforce is described in the following. We initialise the set of cuts K in the generalized assignment formulation in (26) with the feasible or infeasible cuts for all 1-job, 2-job and 3-job assignments for a single worker as described in (30) and (32). This ensures that the initial linear programming relaxation for (26) has an optimal objective value that is greater than 0. The cuts are added to the branch and bound tree of the master problem MIP.

The callback routine is called by the MIP with a vector $(x,z,t^{travel})$ and a boolean flag mipFeas stating whether the solution is feasible to (26). The callback routine is assumed to cache a structure SeenAssignment storing all the single worker assignments that have evaluated using CP. The structure also stores the result on feasibility or infeasibility as determined by the CP solver. The callback routine is executed only when mipFeas is true. The individual job assignments for each worker is based on the variable $x_{w,j,d}=1$. For each of the assignments to a worker w and day d, the CP checks if the assignment has is in the structure SeenAssignment. If seen before, then the algorithm avoids solving the CP formulation in (27) again or adding any further cuts. If not, the CP solver is invoked to solve (27). If feasible cuts are added as described in (30) for all days in (31) and all workers. The structure SeenAssignment is augmented with the new set of assignments. If the assignment is not feasible, then infeasible cuts are added in (32) for all days in (31) and all workers and SeenAssignment is augmented with the new set of assignments.

In case of workers with shared jobs, for each of the set of workers, the single worker assignments are checked for feasibility. If seen before, then CP formulation in (27) is not solved again and cuts are not added. If the single worker assignments are all feasible, the CP solver is invoked to solve (29). If feasible we add cuts as described in (30) for all days in (31). If the assignment is not feasible, then we add infeasible cuts in (32) for all days in (35).

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the appended claims to cover all such variations and modifications as come within the true spirit and scope of the present disclosure.

What is claimed is:

1. A method facilitating servicing of a plurality of machines by one or more worker within a specific period of time, each worker includes a combination of qualifications and located at one or more service center, comprising:

acquiring machine service information via at least one user input interface, for each service, by a computer in communication with the at least one user input interface, the computer having a tangible computer readable recordable medium containing stored program instructions executable by the computer;

acquiring worker information, for each worker, by the computer, wherein the working information associated with each worker comprises the worker's types of transportation modes available at the assigned worker's service center location in the scheduling process;

acquiring constraints to be applied to a cost function, by the computer, the constraints include a specified number of workers with qualifications that are concurrently present for a specific service, each worker starts and ends the specific period of time at the same location and travels independently from other workers and each service needs to be performed within the specific period within the predetermined time window; and determining the cost function representing a service schedule for each worker for the specific period of time, wherein an optimization of the cost function is subject to the constraints, such as assigning of services to each worker and routing of each worker based upon a sequence in which the services are to be performed, and the worker's types of transportation modes available at the assigned worker's service center location in the scheduling process, such that if the constraints cannot verify at least one acceptable solution, then a user via the at least one user interface imposes additional constraints, otherwise, when the constraints verify the at least one acceptable solution and the cost function includes one or combination of: maximizing a number of services to be performed by each worker; minimizing a number of workers required to perform servicing for each service; a minimum cumulative risk of component failure or minimizing a total travel time for each worker to the location to be serviced.

2. The method of claim 1, further comprising:

receiving a user input on a surface of the at least one user input interface, wherein the user input relates to a service non-completion for a machine within the scheduled period of time, and processing the user input to determine a revised change in the time duration for servicing the machine, along with a revised change in the specified number of workers having appropriate qualifications to be concurrently present for the specific service to be performed; and repeating the determining and the optimizing step after receiving the user input, until a revised service schedule for each worker is produced for another specific period of time.

3. The method of claim 1, wherein the machine service information includes an available period of time to perform servicing of a machine, an available predetermined time window to perform servicing the machine, a time duration for servicing of the machine, a location of the machine, and a specified number of workers having appropriate qualifications to be concurrently present for a specific service to be performed.

4. The method of claim 1, wherein the worker information includes an availability of the worker to perform servicing, qualifications of the worker and location of the worker.

5. The method of claim 1, further comprising:

receiving a user input on a surface of the at least one user input interface to set a user time-limit for determining the service schedule, and processing the user input to determine if the user time-limit is met.

6. The method of claim 1, wherein a constraint programming algorithm is used to solve the optimization of the cost function or a mixed integer programming algorithm is used to solve the optimization of the cost function.

7. The method of claim 1, wherein a mixed integer programming algorithm is used in combination with a constraint programming algorithm to solve the optimization of the cost function.

8. The method of claim 7, wherein the mixed integer programming algorithm is used to solve for:

determining a set of services to be performed within the specific period of time and within the available predetermined time window for servicing each machine, and then, determining a set of available and qualified workers to perform the servicing for each service within the specific period of time and within the available predetermined time window for servicing each machine.

9. The method of claim 8, wherein after the mixed integer programming algorithm has determined the set of services to be performed within the specific period of time and the set of available and qualified workers, to perform the servicing for each service within the specific period of time, then the constraint programming algorithm is used to solve for:

determining a service sequencing, in which, the set of services are to be performed within the specific period of time, based upon the available predetermined time window for servicing each machine and the set of available and qualified workers, and then, assigning each worker, a sequence in which the services are performed, subject to obtaining a feasible solution, if the feasible solution is not obtained, then add a constraint to invalidate this assignment of services to the worker, and repeat the mixed integer programming algorithm, until the feasible solution is obtained, so as to determine the maximize number of services to be performed within the specific period of time.

10. The method of claim 1, wherein the plurality of machines are elevators.

11. The method of claim 10, further comprising:
acquiring, for each service, historical elevator servicing data of the elevator being serviced,
determining if components of the elevator have been serviced within each component's predetermined servicing time-limit, for each component not serviced within the component's predetermined servicing time-limit, a penalty point is assigned per each service of the elevator,
evaluating each component's assigned total penalty points, and comparing the total penalty points to a threshold specifically set for each component, such that if the total penalty points are above the threshold, priority is given to servicing the elevator over other services in the next specific period of time for servicing the plurality of elevators.

12. The method of claim 11, wherein the penalty point is based upon the component of the failure probability times the impact of failure and the threshold is an estimated measure of a risk of failure of the component.

13. The method of claim 1, wherein the additional constraints include one of complex constraints, constraints revealed to the user after a solution has been accepted or constraints that need to be modified to render the problem feasible.

14. A system facilitating servicing a plurality of machines by a plurality of workers, comprising:
at least one user input interface to accept machine service information and worker information, wherein the working information associated with each worker comprises the worker's types of transportation modes available at the assigned worker's service center location in the scheduling process; and
a computer having a computer readable recordable memory and in communication with the at least one user input interface, and has stored therein program instructions executable by the computer, wherein the computer also includes stored constraints to be applied to a cost function, the constraints include a specified number of workers with qualifications that are concurrently present for a specific service, each worker starts and ends the specific period of time at the same location and travels independently from other workers and each service needs to be performed within the specific period within the predetermined time window;
wherein the computer is configured to;
determine the cost function representing a service schedule for each worker for the specific period of time, wherein an optimization of the cost function is subject to the constraints, such as assigning of services to each worker and routing of each worker based upon a sequence in which the services are to be performed, and the worker's types of transportation modes available at the assigned worker's service center location in the scheduling process, such that the cost function includes one or combination of: maximize a number of services to be performed by each worker; minimize a number of workers required to perform servicing for each service; a minimum cumulative risk of component failure or minimize a total travel time for each worker to the location to be serviced; and at least one output interface for rendering to the worker a corresponding service schedule.

15. The system of claim 14, further comprising:
a user input is provided on a surface of the at least one user input interface and received by the computer, wherein the user input relates to a service non-completion for a machine within the scheduled period of time, and processing the user input to determine a revised change in the time duration for servicing the machine, along with a revised change in the specified number of workers having appropriate qualifications to be concurrently present for the specific service to be performed; and
repeat the determining and the optimizing step after receiving the user input, until a revised service schedule for each worker is produced for another specific period of time.

16. The system of claim 14, wherein the machine service information includes an available period of time to perform servicing of a machine, an available predetermined time window to perform servicing the machine, a time duration for servicing of the machine, a location of the machine, and a specified number of workers having appropriate qualifications to be concurrently present for a specific service to be performed and the worker information includes an availability of the worker to perform servicing, qualifications of the worker and location of the worker.

17. The system of claim 14, wherein the optimization of the cost function is subject to the constraints, such that the constraints reduce an amount of determinable variable values while determining the service schedule, which results in a reduced amount of data processed, and in turn reduces an amount of processing time by the computer.

18. The system of claim 14, wherein a mixed integer programming algorithm is used in combination with a constraint programming algorithm to solve the optimization of the cost function.

19. The system of claim 18, wherein the mixed integer programming algorithm is used to solve for:
determining a set of services to be performed within the specific period of time and within the available predetermined time window for servicing each machine, and then,
determining a set of available and qualified workers to perform the servicing for each service within the specific period of time and within the available predetermined time window for servicing each machine.

20. The system of claim 19, wherein after the mixed integer programming algorithm has determined the set of services to be performed within the specific period of time and the set of available and qualified workers, to perform the servicing for each service within the specific period of time, then the constraint programming algorithm is used to solve for:
determining a service sequencing, in which, the set of services are to be performed within the specific period of time, based upon the available predetermined time window for servicing each machine and the set of available and qualified workers, and then,
assigning each worker a sequence in which the services are performed, subject to obtaining a feasible solution, if the feasible solution is not obtained, then add a constraint to invalidate this assignment of services to the worker, and repeat the mixed integer programming algorithm, until the feasible solution is obtained, so as to determine the maximize number of services to be performed within the specific period of time.

* * * * *